United States Patent
Schweitzer, III et al.

(10) Patent No.: US 9,383,735 B2
(45) Date of Patent: Jul. 5, 2016

(54) DISTRIBUTED COORDINATED ELECTRIC POWER DELIVERY CONTROL SYSTEM USING COMPONENT MODELS

(71) Applicant: Schweitzer Engineering Laboratories, Inc., Pullman, WA (US)

(72) Inventors: Edmund O. Schweitzer, III, Pullman, WA (US); David E. Whitehead, Pullman, WA (US); Gregory C. Zweigle, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 558 days.

(21) Appl. No.: 13/828,976

(22) Filed: Mar. 14, 2013

(65) Prior Publication Data

US 2014/0100702 A1    Apr. 10, 2014

Related U.S. Application Data

(60) Provisional application No. 61/709,614, filed on Oct. 4, 2012.

(51) Int. Cl.
| | | |
|---|---|---|
| *G05B 13/02* | (2006.01) | |
| *H02J 13/00* | (2006.01) | |
| *H02H 7/26* | (2006.01) | |

(52) U.S. Cl.
CPC ............... *G05B 13/02* (2013.01); *H02H 7/261* (2013.01); *H02J 13/0079* (2013.01); *Y02E 60/724* (2013.01); *Y02E 60/725* (2013.01); *Y04S 10/18* (2013.01); *Y04S 10/20* (2013.01)

(58) Field of Classification Search
CPC .................................. G05B 13/02; H02J 3/12
See application file for complete search history.

(56) References Cited

U.S. PATENT DOCUMENTS

| | | | |
|---|---|---|---|
| 5,160,926 | A | 11/1992 | Schweitzer, III |
| 5,680,324 | A | 10/1997 | Schweitzer, III |
| 5,793,750 | A | 8/1998 | Schweitzer, III |
| 6,121,886 | A | 9/2000 | Andersen |
| 6,380,949 | B2 | 4/2002 | Thomas |
| 6,388,901 | B2 | 5/2002 | Sato |
| 6,662,124 | B2 | 12/2003 | Schweitzer |
| 6,671,635 | B1 | 12/2003 | Forth |
| 6,757,282 | B1 | 6/2004 | Ofek |

(Continued)

FOREIGN PATENT DOCUMENTS

WO        2013017363        2/2013

OTHER PUBLICATIONS

Carl B. Hauser, David E. Bakken, Anjan Bose, A Failure to Communicate, IEEE Power and Energy Magazine, Mar./Apr. 2005.

(Continued)

*Primary Examiner* — Mohammad Ali
*Assistant Examiner* — Bernard G Lindsay
(74) *Attorney, Agent, or Firm* — Jared L. Cherry; Richard M. Edge

(57) ABSTRACT

Distributed controllers in an electric power delivery system obtain measurements and equipment status, calculate derived values, and determine Intelligent Electronic Device (IED) state, and share such with other distributed controllers and coordination controllers. Distributed controllers and coordination controllers further refine measurements, equipment status, derived values, and IED state. Control of the electric power delivery system is coordinated among the distributed controllers and the coordination controllers.

26 Claims, 9 Drawing Sheets

(56) References Cited

U.S. PATENT DOCUMENTS

| | | |
|---|---|---|
| 6,795,789 B2 | 9/2004 | Vandiver |
| 6,871,224 B1 | 3/2005 | Chu |
| 6,944,555 B2 | 9/2005 | Blackett |
| 6,947,269 B2 | 9/2005 | Lee |
| 6,957,158 B1 | 10/2005 | Hancock |
| 6,961,641 B1 | 11/2005 | Forth |
| 6,990,395 B2 | 1/2006 | Ransom |
| 7,080,142 B2 | 7/2006 | Galloway |
| 7,174,258 B2 | 2/2007 | Hart |
| 7,188,003 B2 | 3/2007 | Ransom |
| 7,231,003 B2 | 6/2007 | Lee |
| 7,415,368 B2 | 8/2008 | Gilbert |
| 7,415,725 B2 | 8/2008 | Henneberry |
| 7,421,531 B2 | 9/2008 | Rotvold |
| 7,447,760 B2 | 11/2008 | Forth |
| 7,457,872 B2 | 11/2008 | Aton |
| 7,460,347 B2 | 12/2008 | Schweitzer, III |
| 7,460,590 B2 | 12/2008 | Lee |
| 7,463,467 B2 | 12/2008 | Lee |
| 7,666,004 B2 | 2/2010 | Johnson |
| 7,693,607 B2 | 4/2010 | Kasztenny |
| 7,870,595 B2 | 1/2011 | Finney |
| 7,899,619 B2 | 3/2011 | Petras |
| 7,987,059 B2 | 7/2011 | Gong |
| 8,082,367 B2 | 12/2011 | Etheridge |
| 8,260,579 B2 | 9/2012 | Bickel |
| 2001/0022734 A1 | 9/2001 | Sato |
| 2002/0173927 A1 | 11/2002 | Vandiver |
| 2004/0138834 A1 | 7/2004 | Blackett |
| 2004/0138835 A1 | 7/2004 | Ransom |
| 2004/0193329 A1 | 9/2004 | Ransom |
| 2005/0138111 A1 | 6/2005 | Aton |
| 2005/0138432 A1 | 6/2005 | Ransom |
| 2005/0144437 A1 | 6/2005 | Ransom |
| 2005/0280965 A1 | 12/2005 | Lee |
| 2006/0155908 A1 | 7/2006 | Rotvold |
| 2006/0230394 A1 | 10/2006 | Forth |
| 2007/0096765 A1 | 5/2007 | Kagen |
| 2007/0133724 A1 | 6/2007 | Mazereeuw |
| 2008/0052435 A1 | 2/2008 | Norwood |
| 2008/0075019 A1 | 3/2008 | Petras |
| 2008/0162930 A1 | 7/2008 | Finney |
| 2009/0254655 A1 | 10/2009 | Kidwell |
| 2010/0013632 A1* | 1/2010 | Salewske ........... G01R 19/2513 340/540 |
| 2011/0035065 A1* | 2/2011 | Schweitzer, III ... H02J 13/0062 700/286 |
| 2011/0066301 A1* | 3/2011 | Donolo .................... H02J 3/12 700/292 |
| 2011/0282508 A1* | 11/2011 | Goutard ................ H04L 63/20 700/293 |
| 2012/0226386 A1 | 9/2012 | Kulathu |
| 2013/0035800 A1 | 2/2013 | Kulathu |

OTHER PUBLICATIONS

Edmund O. Schweitzer, III, David E. Whitehead, Real-Time Power System Control Using Synchrophasors, Sep. 11, 2007.

Edmund O. Schweitzer, III, David E. Whitehead, Real-World Synchrophasor Solutions, Sep. 17, 2008.

John C. Eidson, John Tengdin, IEEE-1588 Standard for a Precision Clock Synchronization Protocol for a Networked Measurement and Control System and Applications in the Power Industry, 2003.

M. Kezunovic, G. Latisko, Automated Monitoring Functions for Impoved Power System Operation and Control, IEEE, 2005.

PCT/US2010/045086, Patent Cooperation Treaty, International Search Report and Written Opinion of the International Searching Authority, Oct. 8, 2010.

ScadaWorks, SCADA System Development Tools, Technical Reference Manual, 2003.

W.J. Ackerman, The Impact of IEDs on the Design of Systems Used for Operation and Control of Power Systems, Power System Management and Control, Apr. 17-19, 2002.

Wobshal, Network Sensors for the Smart Grid, Sensors Expo, 2010.

PCT/US2013/062650, Patent Cooperation Treaty, International Search Report and Written Opinion of the International Searching Authority, Jan. 7, 2014.

* cited by examiner

DISTRIBUTED COORDINATED ELECTRIC POWER DELIVERY CONTROL SYSTEM USING COMPONENT MODELS

RELATED APPLICATION

The present application claims the benefit under 35 U.S.C. §119(e) of U.S. Provisional Patent Application No. 61/709,614, filed Oct. 4, 2012, titled "Distributed Coordinated Wide Area Control for Electric Power Systems," which application is incorporated herein by reference in its entirety.

TECHNICAL FIELD

This disclosure relates to distributed coordinated wide-area control of electric power delivery systems. More particularly, this disclosure relates to sharing of measurements, equipment status, derived values, and Intelligent Electronic Device (IED) states among controllers. The disclosure further relates to refinement of measurements, equipment status, derived values, and IED state among controllers.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
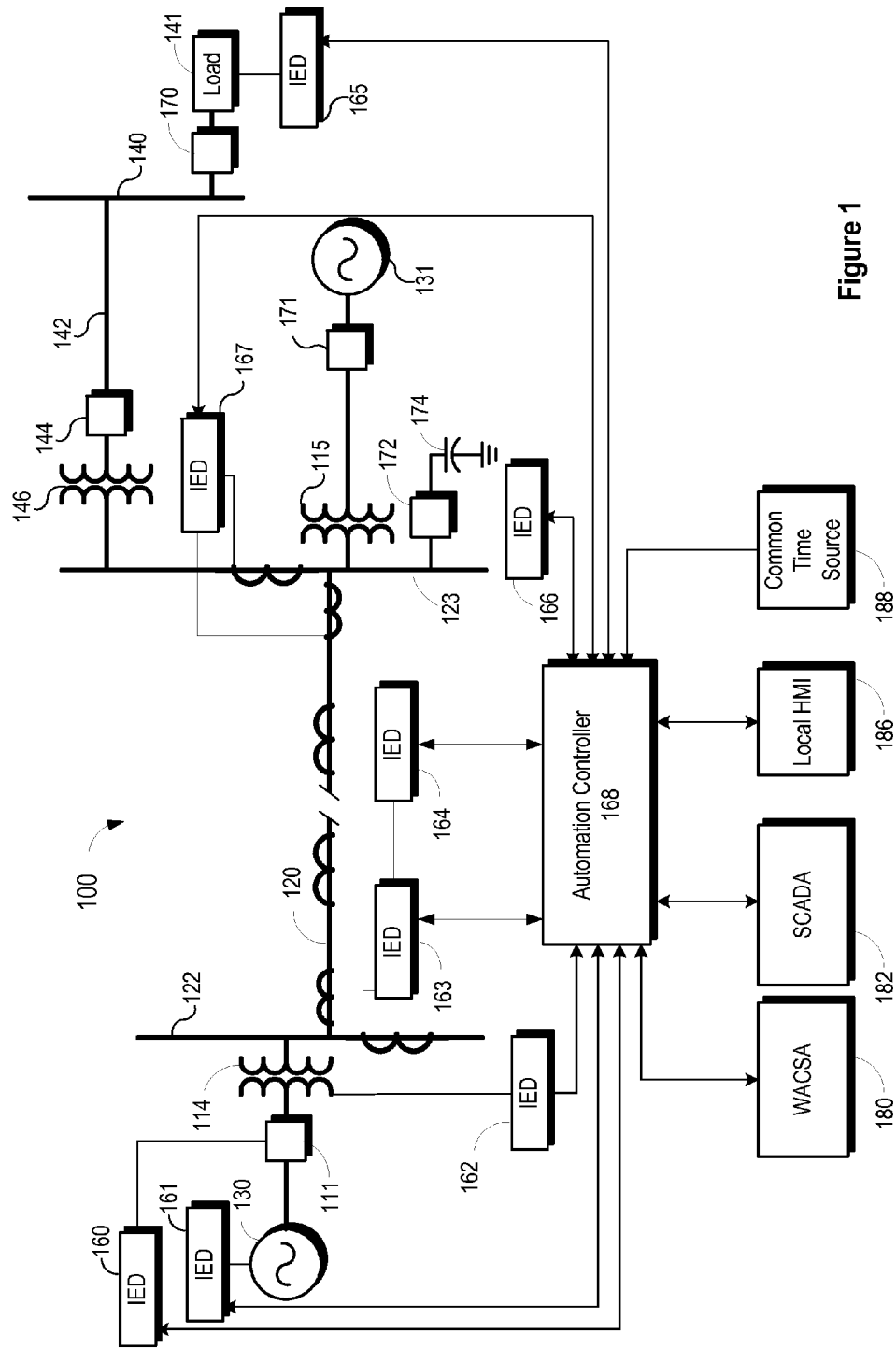
FIG. 1 is a simplified one-line diagram of an electric power delivery system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need be executed only once, unless otherwise specified.

In some cases, well-known features, structures, or operations are not shown or described in detail. Furthermore, the described features, structures, or operations may be combined in any suitable manner in one or more embodiments. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

Electrical power generation and delivery systems are designed to generate, transmit, and distribute electrical energy to loads. Electrical power generation and delivery systems may include equipment such as: machines (electrical generators, electrical motors, and the like); power transformers, power transmission and distribution lines, circuit breakers, switches, buses, voltage regulators, capacitor banks, and the like. Such equipment may be monitored, controlled, automated, and/or protected using intelligent electronic devices (IEDs) that receive electric power delivery system information from the equipment, make decisions based on the information, and provide monitoring, control, protection, and/or automation outputs to the equipment. As used herein, monitoring, control, protection, and/or automation may generally be referred to as "control" unless otherwise specifically indicated.

In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a network that includes, for example, multiplexers, routers, hubs, gateways, firewalls, and/or switches to facilitate communications on the networks. Networking and communication devices may also be integrated into an IED and/or be in communication with an IED. As used herein, an IED may include a single discrete IED or a system of multiple IEDs operating together.

FIG. 1 illustrates a simplified diagram of an example of an electric power delivery system 100 consistent with embodiments disclosed herein. The systems and methods described herein may be applied and/or implemented in the system electric power delivery system 100 illustrated in FIG. 1. Although illustrated as a one-line diagram for purposes of simplicity, an electrical power delivery system 100 may also be configured as a three-phase power system. The electric power delivery system 100 may include, among other things, electric generators 130 and 131, configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

Typically, electric power delivery systems have been reliable. However, the possibility of events exists that can drive electric power delivery systems into an unstable state. Generally, instabilities include, for example, rotor angle instability, voltage collapse, frequency deviation, and instability due to structural limitations of the electric power delivery system. Rotor angle instability generally refers to a situation when a rotational component of a large synchronous machine spins out of step with another large synchronous machine. An initiating cause of rotor angle instability may be a short circuit which reduces the electric load on the machine to the point where mechanical energy into the machine accelerates the rotor past a point of stability. Voltage collapse generally refers to loads demanding more power than the electric power delivery system (or machines thereof) can deliver. The voltage then decreases which results in additional current draw. Resultant current levels may result in further voltage drop, and the effect continues until generation is unable to supply the needed reactive power. Large frequency deviations may be caused by transient imbalances between the supply and consumption of electrical power. A final type of instability may be due to structural limitations on the electrical power delivery system including the ability to transfer power. One such example is when thermal limitations result in lines being taken out of service.

As mentioned above, modern electric power delivery systems (which may include electric power generation systems, transmission systems, distribution systems, and consumption systems) are controlled using IEDs. FIG. 1 illustrates several IEDs 160-167 that may be configured to control the one or more elements of the electric power delivery system. An IED may be any processor-based device that controls monitored equipment within an electric power delivery system (e.g., system 100). IEDs may obtain and/or derive a state of the electric power delivery system. The state may include equipment status, measurements, derived values, and IED state. In some embodiments, the IEDs 160-167 may gather equipment status from one or more pieces of monitored equipment (e.g., generator 130). Equipment status may relate to the status of the monitored equipment, and may include, for example, breaker or switch open or closed, valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like.

With the equipment status and/or measurements, IEDs may be configured to derive or calculate derived values. Such derived values may be any values derived or calculated from the measurements and/or equipment status and may include, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

IEDs may also determine a protection or controller condition using equipment status, measurements, and/or derived values, applied to an IED model. The controller condition may include, for example, a state of the IED protection, automation, control, or metering elements, encroachment timers, an integrating over-current integration position, pickup counts for enabling a release of a trip signal, and the like. Although referred to herein in terms of an IED model, the controller condition could be a control state of a protection element of an electromechanical relay, as described in more detail hereafter.

IEDs may be used to control various aspects of the electric power delivery system. To this end, they may include protection elements such as, for example, an instantaneous overcurrent element; an inverse-time overcurrent element; a thermal element; a reactive power threshold; a distance element; a current differential element; a load encroachment element; an impedance characteristic; a volts/Hz characteristic; an undervoltage element; a directional element; a negative sequence current element; a loss of excitation element; a negative sequence voltage element; an overvoltage element; a ground fault element; a high-impedance fault element; an underfrequency element; an overfrequency element; and the like.

Furthermore, IEDs may include control elements, related to electric power delivery system equipment. Accordingly, an IED may be configured as a reactive power controller, a capacitor bank controller, a transformer tap changing controller, a generator over-excitation limit controller, a governor controller, a power system stabilizer controller, a shunt reactor controller, a DC line controller, an inverter controller, and the like. It should be noted that a single IED may include one or more protection elements and/or control elements.

According to certain embodiments, IEDs 160-167 may issue control instructions to the monitored equipment in order to control various aspects relating to the monitored equipment. Typical control actions may be described as being in one of two categories: namely, discontinuous control, and continuous control.

Discontinuous control actions may be described as modifying a topology of the electric power delivery system. Some examples of discontinuous control actions include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor.

Continuous control actions may be described as control actions that do not modify a topology of the electric power delivery system. Examples of continuous control actions include: adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold.

As mentioned above, IEDs may include an IED model which may include, for example, protection and/or control logic, IED characteristics, elements, thresholds, settings, and the like. The IED may apply equipment status, measurements, and/or derived values to the IED model to determine a controller condition and/or control instructions. As described above, control instructions may be continuous or discontinuous, and may include commands such as breaker trip, breaker close, recloser open or close, tap up, tap down, exciter voltage control, inverter control, and the like.

For example, an IED may include an inverse-time overcurrent element, and may derive current magnitudes of a conductor from current measurements thereof. The IED may apply the current magnitudes to the inverse-time overcurrent element to determine the time for which a current of a certain magnitude must persist before issuing an open (or trip) command to a circuit breaker. Accordingly, the IED may apply equipment status, measurements, and/or derived values to an IED model to determine a controller condition and/or a control instruction.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electrical power generation and delivery system 100 illustrated in FIG. 1 may be configured to generate, transmit, and/or receive Generic Object-Oriented Substation Events (GOOSE) messages, or communicate using any other suitable communication protocol. For example, an automation controller 168 may communicate certain control instructions to IED 163 via messages using a GOOSE communication protocol.

The illustrated embodiments are configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loop, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

As is detailed above, the electric power delivery system 100 illustrated in FIG. 1 includes local control and protection using IEDs 160-167, and wide-area control using the automation controller 168 and/or WACSA 180 and/or SCADA 182.

The present disclosure describes a distributed and coordinated wide-area control system for an electric power delivery system. FIG. 1 illustrates, and above generally describes a control system for an electric power delivery system where protection and control is performed locally by IEDs, operational conditions are communicated to higher-level data acquisition and control systems (such as an automation controller, WACSA, and SCADA), and the higher-level data acquisition and control systems communicate command instructions down to IEDs. However, certain information may not be made available to IEDs for improved control of the electric power delivery system, and certain information from the IEDs may not be available to higher-level data acquisition and control systems for improved control of the electric power delivery system.

Figure 2:
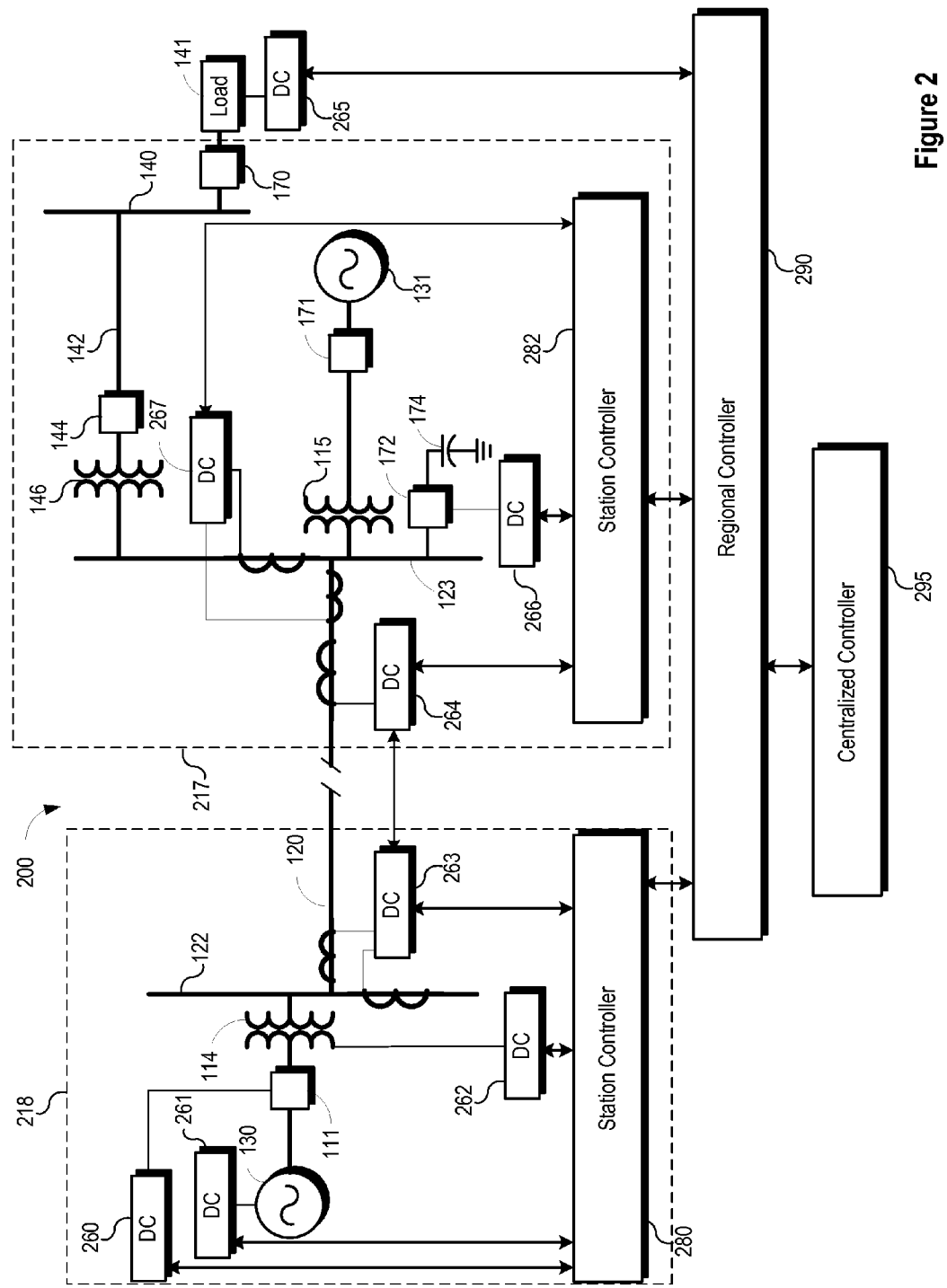
FIG. 2 is a simplified one-line diagram of an electric power delivery system with distributed coordinated wide-area control.

FIG. 2 illustrates a simplified one-line diagram of an electric power delivery system similar to that of FIG. 1, with a distributed coordinated wide-area control system for protection, monitoring, automation, and control thereof. In general, both operational conditions and controller conditions are shared among distributed controllers and coordination controllers throughout the system, providing each controller with information necessary to improve automation, protection, and control of the electric power delivery system.

FIG. 2 includes generators 130 and 131, transformers 114, 115, and 146, buses 122, 123, and 140, transmission line 120, distribution line 142, load 141, SCB 174, and breakers 111, 144, 170, 171, and 172. FIG. 2 also illustrates that certain of the equipment may be included in certain regions 218 and 217 which may be geographically separated by long distances. Region 218 may include, among others, generator 130, transformer 114, transmission bus 122, and one end of transmission line 120, and various breakers. Region 217 may include, among others another end of transmission line 120, transmission bus 123, transformers 115 and 146, distribution bus 140, generator 131, SCB 174, and various breakers.

Various types of equipment may be controlled using distributed controllers 260-267. Distributed controllers may include the functions of IEDs as described above. That is, distributed controllers generally may obtain equipment status and/or measurements, derive or calculate derived values therefrom, and determine controller conditions and control instructions by including IED functionality. The IED functionality, as part of an integrated module, may include, for example, protection and/or control logic, IED characteristics, elements, thresholds, settings, and the like. Control instructions may include, as described above, commands such as breaker trip, breaker close, recloser open or close, tap up, tap down, exciter voltage control, inverter control, and the like.

As described above in conjunction with IED functionality, a distributed controller may include, as part of its IED module, an inverse-time overcurrent element, and may derive current magnitudes of a conductor from current measurements thereof. The distributed controller may apply the current magnitudes to the inverse-time overcurrent element to determine the time for which a current of a certain magnitude must persist before issuing an open (or trip) command to a circuit breaker to protect the electric power delivery system. Accordingly, the distributed controller may apply operational conditions to an IED module to determine a controller condition and a control instruction.

FIG. 2 illustrates several examples of distributed controllers 260-267 for control of the electric power delivery system 200. Distributed controllers 260-267 may be in communication with equipment of the electric power delivery system 200, may obtain equipment status and measurements therefrom, may derive or calculate derived values, and apply such to their IED module. For example, distributed controller 261 may be in communication with generator 130 to receive measurements therefrom such as currents, voltages, temperatures, rotational signals, and the like, and to receive equipment status therefrom such as exciter voltages and the like. Distributed controller 261 may derive or calculate derived values such as voltage magnitude and angle, current magnitude and angle, shaft rotational position, shaft speed, phase angle, power angle, frequency, rate of change of frequency, and the like. Distributed controller 261 may apply certain of the operational conditions to an IED module. For example, distributed controller 261 may apply the calculated frequency to an overfrequency element, as part of the IED module, to determine if, and when, a control action (such as a breaker open, exciter voltage change, or the like) should be taken, and then to take that action.

Similarly, distributed controller 262 may be in communication with transformer 114, and may calculate or derive current and voltage magnitudes and angles for transformer high-side windings, low-side windings, tertiary windings and the like from obtained voltage and current measurements, and may obtain oil temperatures from the transformer 114. Distributed controller 262 may apply such operational conditions to, for example, an IED module to determine if transformer 114 should be removed from service for certain conditions such as insulator breakdown, oil temperature exceeding a threshold, and the like. The IED module may include, for example, a through-fault element, an overload element, a differential element, a ground fault protection element, and the like.

Distributed controllers 263 and 264 may be in communication with transmission line 120, and may obtain voltage and/or current measurements therefrom, and may derive or calculate voltage and/or current magnitudes and/or angles, power flow, symmetrical components, alpha components, Clarke components, and the like therefrom. Distributed controllers 263 and 264 may be configured to apply differential protection to transmission line 120, and, therefore, the IED module may include, for example, differential protection elements.

Distributed controller 265 may be in communication with a load center 141. In one embodiment, distributed controller 265 may be a meter configured to meter power to load center 141. In this embodiment, distributed controller may obtain voltage and/or current measurements, and derive or calculate, for example, voltage and/or current magnitudes and/or angles, power flow, symmetrical components, alpha components, Clarke components, and the like therefrom. The IED module of distributed controller 265 may include metering algorithms for metering power flow to load 141.

In another embodiment, distributed controller 265 may be a voltage regulator control in communication with a voltage regulator configured to regulate voltage to load 141. In this embodiment, distributed controller 265 may obtain voltage measurements, current measurements, and voltage regulator status (e.g. tap position from the voltage regulator). Distributed controller 265 may then derive or calculate voltage and/or current magnitudes and/or angles at the voltage regulator, voltage and/or current magnitudes and/or angles at a load center, power flow, symmetrical components, alpha components, Clarke components, and the like therefrom. Distributed controller 265 may include an IED module that includes a voltage regulation module configured to control electrical power to be within a certain voltage band to load center 141. Distributed controller 265 may apply the equipment status, measurements, and derived values to the IED module to determine an appropriate tap position or tap change for the voltage regulator. Distributed controller 265 may then issue a tap change command to the voltage regulator depending on the determination.

Distributed controller 266 may be configured to control the electric power delivery system 200 by controlling SCB 174. In this embodiment, distributed controller 266 may obtain voltage measurements, current measurements, and breaker status (e.g. from breaker 172). Distributed controller 266 may then derive or calculate voltage and/or current magnitudes and/or angles, voltage and/or current magnitudes and/or angles at a load center, real power, reactive power, symmetrical components, alpha components, Clarke components, and the like therefrom. Distributed controller 266 may include an IED module configured to control reactive power on the electric power delivery system to be within an acceptable range by switching on the SCB 174 when reactive power falls below a predetermined threshold. Distributed controller 266 may apply the equipment status, measurements, and derived values to the IED module to determine whether to connect the SCB 174. Distributed controller 266 may then issue command to the breaker 172 depending on the determination.

It should be noted that FIG. 2 does not include an exhaustive list of examples of electric power delivery system equipment, nor does it include an exhaustive list of possible IED module for providing control to electric power delivery system machines or equipment. However, the concepts described herein may be applied to various distributed controllers even if not specifically discussed herein.

Further, it should be noted that IED module may include certain predetermined thresholds and other settings. For example, an inverse-time overcurrent element may include settings for the particular system to which the element is applied. Furthermore, predetermined trip times may be set to correspond with fuse values. Voltage regulation may include settings corresponding to acceptable voltage levels. Generator protection elements may require settings corresponding to the generator being protected. Similarly, motor protection elements may require settings corresponding to the motor being protected. In accordance with this disclosure, such predetermined thresholds and settings, along with any thresholds or settings determined by the IEDs or the system, may be part of the IED module.

FIG. 2 also provides an indication of certain electric power delivery system equipment that are included in the same geographic location or substation. For example, region 218 may include generator 130, breaker 111, step-up transformer 114, bus 122, and part of transmission line 120. Region 218 may be considered a generation substation. Region 217 may include a portion of transmission line 120, bus 123, step-up transformer 115, step-down transformer 146, breakers 144, 170, 171, and 172, SCB 174, generator 131, and bus 140. Regions 218 and 217 may further include devices for protection, control, automation, and/or metering of the electric power delivery system. For example, region 218 may include distributed controllers 260-263. Region 217 may include distributed controllers 264, 266, and 267.

As described above in conjunction with FIG. 1, electric power delivery systems may be controlled using IEDs and higher-level controllers such as automation controllers, WACSA systems, SCADA systems, and the like. FIG. 2 further illustrates higher-level controllers used to provide distributed coordinated control for the electric power delivery system 200. Region 218 includes a station controller 280, and region 217 includes station controller 282. Station controller 280 may be in communication with distributed controllers 260-263. Station controller 282 may be in communication with distributed controllers 264, 266 and 267. Regional controller 290 may be in communication with station controllers 280 and 282, as well as with distributed controller 265. Centralized controller 295 may be in communication with regional controller 290. Each of the higher-level controllers (station controllers(s), regional controller(s), and centralized controller(s)) may be considered "coordination controllers" for the purposes of this description.

Coordination controllers and distributed controllers are configured to allow rapid communication of both state and controller conditions between distributed controllers and coordination controllers. With state and controller conditions from other distributed controllers and/or coordination controllers, each of the controllers are then better suited to positively affect distributed and coordinated control of the electric power delivery system 200. As will be described in more detail below, each controller uses the state and controller conditions that are received to affect the control instructions thereof.

It should be noted that communication may take place along any path between any of the controllers—distributed controller or coordination controller. For example, state and IED module from distributed controller 265 may be communicated directly to regional controller 290, and then distributed to the centralized controller 295, and/or station controllers 280 and 282, which may then distribute such to distributed controllers 260-264 and 266-267. Likewise, state and controller conditions may flow from distributed controllers 260-264 and 266-267 to distributed controller 265, regional controller 290, and centralized controller 295 using the station controllers 280 and 282. As is illustrated, information may be shared directly between distributed controllers 263 and 264. However, state and controller conditions may also be shared between distributed controllers 263 and 264 via station controllers 280 and 282. As can be seen, multiple communications paths exist for distribution of information among controllers.

Figure 3:
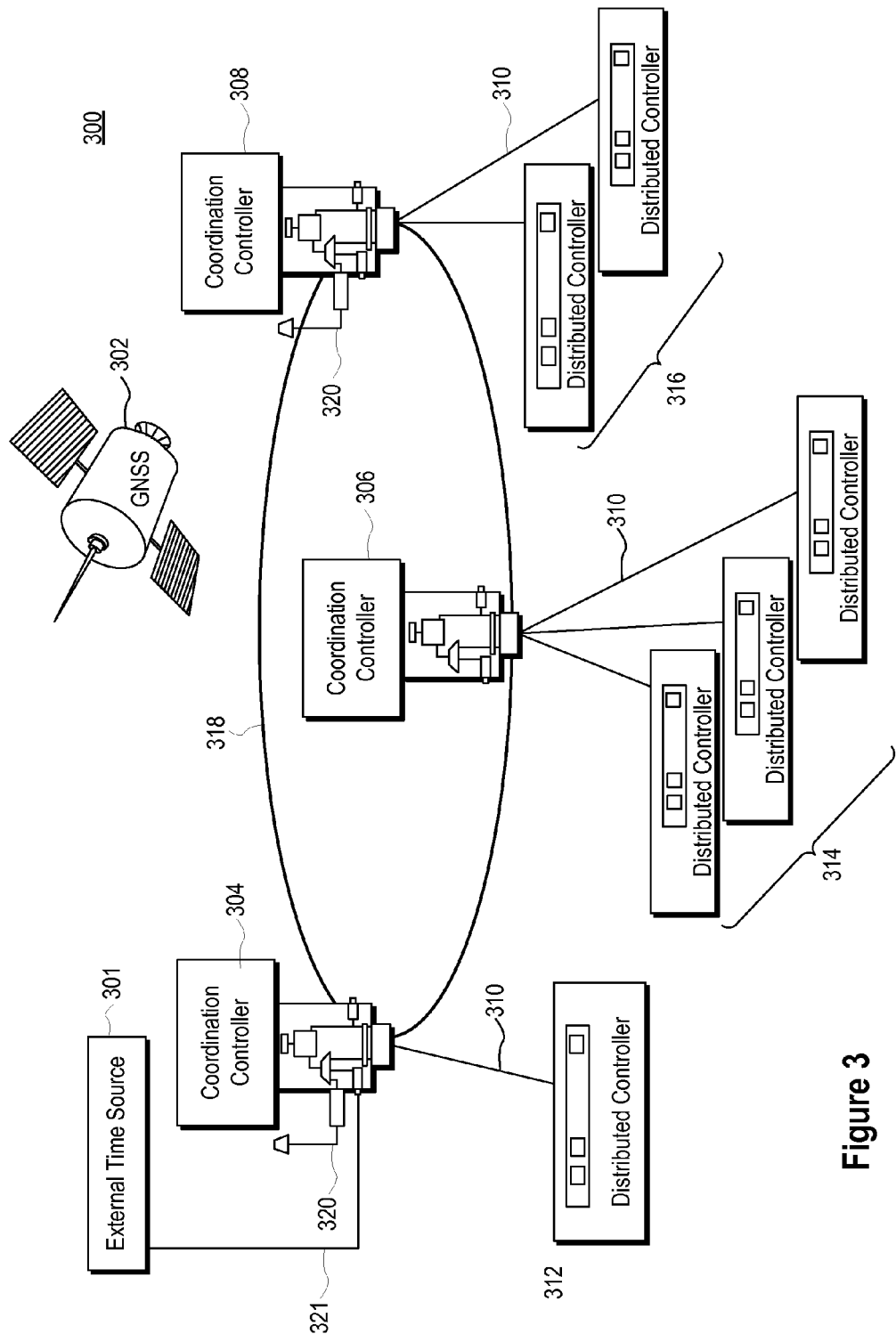
FIG. 3 is an illustration of a communication system for distributed coordinated wide-area control.

FIG. 3 illustrates one example of a communication system 300 for distributing information among controllers. The communication system 300 of FIG. 3 includes several coordination controllers 304, 306, 308, each in communication using a wide-area network (WAN) 318 which may comprise one or more physical connections and protocols. Each coordination controller may be in communication with a number of distributed controllers. For example, coordination controller 304 is in communication with distributed controller 312 using LAN 310, coordination controller 306 is in communication with distributed controllers 314 using LAN 310, and coordination controller 308 is in communication with distributed controllers 316 using LAN 310.

According to various embodiments herein, each communication from any of the controllers may include a time stamp. Furthermore, equipment status, and measurements may include time stamps. State conditions may also include time stamps corresponding to a moment in time when the measurements were made or equipment status was obtained. Further still, certain distributed controllers may depend on a common time for sampling the electric power delivery system. Accordingly, a common time reference may be distributed to the controllers herein. In one embodiment, the common time reference may be made available to each of the controllers using the WAN 318. Each coordination controller 304, 306, and 308 is configured to receive time signals. For example, as illustrated, coordination controller 304 includes an antenna 320 and is configured to receive a GNSS signal from a GNSS repeater or satellite 302. Coordination controller 304 may be configured to receive another time signal 321 from an external time source 301. The external time source may comprise one or more VCTCXOs, phase locked loop oscillators, time locked loop oscillators, rubidium oscillators, cesium oscillators, NIST broadcasts (e.g., WWV and WWVB), and/or other devices capable of generating precise time signals. In the illustrated embodiment, coordination controller 308 includes an antenna 320 configured to receive a GNSS signal from the GNSS repeater or satellite 302. As illustrated, coordination controller 306 does not directly receive an external time signal, however, according to alternative embodiments, any number and variety of external time signals may be available to any of the time distribution devices.

According to one embodiment, WAN 318 comprises a Synchronous Optical Network (SONET) configured to embed a precision time reference in a header or overhead portion of a SONET frame during transmission. Alternatively, a precision time reference may be conveyed using any number of time communications methods including Inter-Range Instrumentation Group (IRIG) protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure.

Distributed controllers 312, 314, and 316 may receive a common time signal from coordination controller 304. In another embodiment, distributed controllers 312, 314, and 316 may receive a common time signal from the GNSS repeater or satellite 302.

Figure 4:
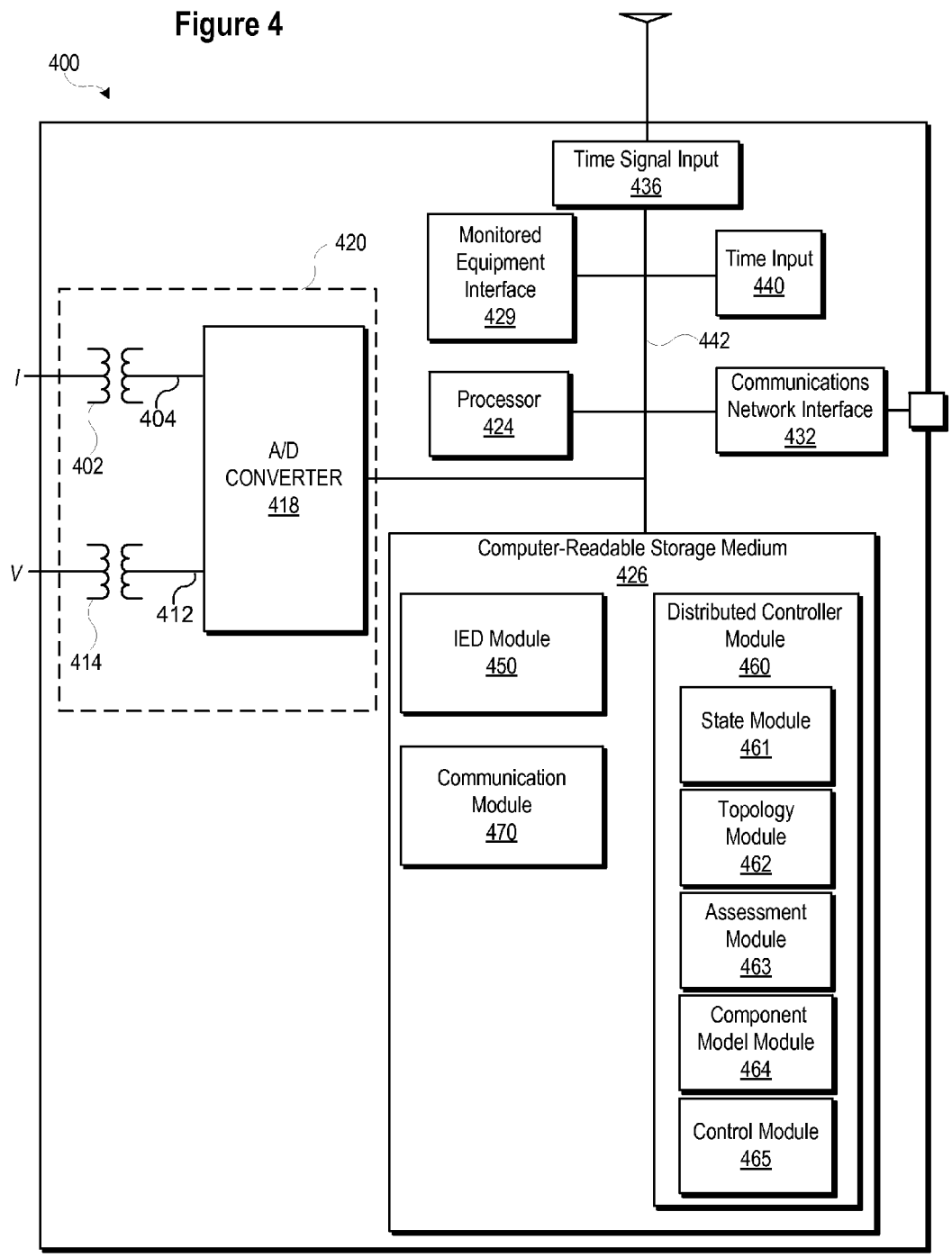
FIG. 4 is a functional block diagram of a distributed controller.

FIG. 4 illustrates a simplified block diagram of a distributed controller 400 according to one embodiment. Not every module of distributed controller 400 is required but it depends on the specific embodiment. Distributed controller 400 includes a network interface 432 configured to communicate with a communication network. Distributed controller 400 also includes a time input 440, which may be used to receive a time signal. In certain embodiments, a common time reference may be received via network interface 432, and accordingly, a separate time input and/or GNSS input 436 would not be necessary. One such embodiment may employ the IEEE 1588 protocol. Alternatively, a GNSS input 436 may be provided in addition or instead of a time input 440.

A monitored machine or equipment interface 429 may be configured to receive equipment status information from, and issue control instructions to a piece of monitored equipment, such as an electrical generator, breaker, voltage regulator control, or the like. According to certain embodiments, the monitored equipment interface 429 may be configured to interface with a variety of equipment of an electric power delivery system. In certain embodiments, the equipment status information and control instructions may be communicated over the communications network interface 432.

A computer-readable storage medium 426 may be the repository of one or more modules and/or executable instructions configured to implement any of the processes described herein. A data bus 442 may link monitored equipment interface 429, time input 440, network interface 432, time signal input 436, and computer-readable storage medium 426 to a processor 424.

Processor 424 may be configured to process communications received via network interface 432, time input 440, GNSS input 436, and/or monitored equipment interface 429. Processor 424 may operate using any number of processing rates and architectures. Processor 424 may be configured to perform various algorithms and calculations described herein using computer executable instructions stored on computer-readable storage medium 426. Processor 424 may be embodied as a general purpose integrated circuit, an application specific integrated circuit, a field-programmable gate array, and other programmable logic devices.

In certain embodiments, distributed controller 400 may include a sensor component 420. In the illustrated embodiment, sensor component 420 is configured to gather data from a portion of the electric power delivery system (not shown) using a current transformer 402 and/or a voltage transformer 414. Voltage transformer 414 may be configured to step-down the power system's voltage (V) to a secondary voltage waveform 412 having a magnitude that can be readily monitored and measured by distributed controller 400. Similarly, current transformer 402 may be configured to proportionally step-down the power system's line current (I) to a secondary current waveform 404 having a magnitude that can be readily monitored and measured by distributed controller 400. Although not separately illustrated, the voltage and current signals V and I may be secondary signals obtained from equipment instruments designed to obtain signals from primary equipment. For example, a secondary voltage signal V may be obtained from a potential transformer ("PT") in electrical communication with a conductor. A secondary current signal I may be obtained from a current transformer ("CT") in electrical communication with a conductor. Various other instruments may be used to obtain signals from electric power delivery systems including, for example, Rogowski coils, optical transformers, and the like. An analog-to-digital converter 418 may multiplex, sample and/or digitize the filtered waveforms to form corresponding digitized current and voltage signals. Similar values may also be received from other distributed controllers, station controllers, regional controllers, or centralized controllers. The values may be in a digital format or other format.

As described above, certain embodiments may monitor the terminal voltage of one or more phases of electrical power generated by an electrical generator. Sensor component 420 may be configured to perform this task. Further, sensor component 420 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

A/D converter 418 may be connected to processor 424 by way of a bus 442, through which digitized representations of current and voltage signals may be transmitted to processor 424. As described above, processor 424 may be used to apply equipment status, measurements, and derived values to an IED module. Processor 424 may be used to determine and issue control instructions.

It should be noted that a separate device may be used in place of a sensor component for providing signals from the electric power delivery system to the distributed controller 400. Indeed, a separate device may be configured to obtain signals from the electric power delivery system (such as voltage and/or current signals), and create digitized representations of the signals (for example current and voltage signals), apply a time stamp, and/or supply such information to the distributed controller 400. Further, the separate device may be configured to supply equipment status and/or measurements such as voltage and/or current magnitudes and/or angles along with time stamps to the distributed controller 400. In certain embodiments, the information that has been described as received from sensor component 420 is instead received from communications network interface 432.

A monitored equipment interface 429 may be configured to receive status information from, and issue control instructions to a piece of monitored equipment. Monitored equipment interface 429 may be configured to issue control instructions to one or more pieces of monitored equipment. According to some embodiments, control instructions may also be issued via network interface 432. Control instructions issued via network interface 432 may be transmitted, for example, to other distributed controllers, coordination controllers, IEDs, or the like (not shown), which in turn may issue the control instruction to a piece of monitored equipment. Alternatively, the piece of monitored equipment may receive the control instruction directly via its own network interface.

Computer-readable storage medium 426 may be the repository of one or more modules and/or executable instructions configured to implement certain functions described herein. For example, computer-readable storage medium 426 may include IED module 450, which may include the modules and/or executable instructions for the IED model. As described above, the IED module may include protection algorithms, elements, settings, thresholds, timers, and the like. The IED module 450 may include instructions for deriving or calculating derived values, for obtaining equipment status, for obtaining measurements, and applying such to the IED module. In applying such to the IED module 450 may determine controller conditions, control instructions, state to communicate, state to store, and the like. Also as noted above, such control instructions may be communicated to monitored equipment using the monitored equipment interface 429. The IED module may further include instructions for applying a time stamp to equipment status as it is obtained, to measurements as they are obtained, to derived values and/or controller condition as they are obtained or corresponding to when the measurements leading thereto are obtained, to control instructions as they are given, and the like.

Computer-readable storage medium 426 may further include a distributed controller module 460, which may be a repository of the modules and/or executable instructions configured to implement distributed controller functionality of distributed controller 400. The distributed controller module 460 may include, among others, a state module 461 for processing the state, a topology module 462, an assessment module 463, a component model module 464, and a control module 465. Each module within the distributed controller module may use state from the IED module 450, from the sensor component 420, from the monitored equipment interface 429, from the time input 440, and/or from other distributed controllers, monitored equipment, or coordination controllers using communications network interface 432.

State module 461 may include instructions to determine an electric power delivery system state which may include state of the monitored equipment and the controller condition. That is, the state may include data for defining a state of the monitored equipment, for example, measurements (voltages, currents, and the like), equipment status (breaker open/closed, and the like), derived values, and/or controller condition. The measurements, equipment status, and derived values may be received from sensor component 420, from communication network interface 432, or from monitored equipment interface 429. The measurements may be received with time-stamps or may be issued a corresponding time-stamp by using time signal input 436, or the time received from communication network interface 432, as previously described. The protection or controller condition may be received from external IED devices using the sensor component 420, or communication network interface 432, or monitored equipment interface 429. The state module 461 may also include instructions to obtain such state information from the IED module 450, and the IED module 450 might also include instructions to calculate a protection or controller condition. The state module 461 may include instructions to derive such state information based on a model from the component model module 464, to be described in more detail below. The state module 461 may further include instructions to refine information from the IED module 450 based on a model from the component model module 464. The state module 461 may refine values using a filter such as a low-pass filter. The state module 461 may refine values by comparing values against expected ranges and/or other recent measurements. When such values are not acceptable based on the expected ranges and/or other recent measurements, the values may be indicated as being potentially inaccurate. As described in more detail below, the communication module 470 may include instructions to send information from the state module 461 to other distributed controllers and/or coordination controllers, and include with the information the indication that such information may be inaccurate.

Topology module 462 may include instructions to determine a topology of at least a portion of the electric power delivery system. The topology module 462 may receive information concerning the topology of the electric power delivery system from, for example, a user, other distributed controllers or coordination controllers, or the like. The topology information may be limited by the user to include a portion of the electric power delivery system topology. The topology module 462 may include instructions to modify the stored topology information based on state. For example, if the distributed controller receives information concerning open or closed status of a switch, the topology module 462 may be configured to update its topology based on the received information concerning the open or closed status of the switch. Further, the topology processor 462 may be configured to use values such as currents and/or voltages to determine the topology. For example, Kirchhoff's law may be used to determine which nodes of the topology are connected to which other nodes of the topology, and, hence, the topology may be updated using such information. Additional methods for determining a topology are found in U.S. Pat. No. 7,856,327 titled "State and Topology Processor" naming Edmund O. Schweitzer, Marcos A. Donolo, and Armando Guzman-Casillas as inventors, which is hereby incorporated by reference in its entirety.

Assessment module 463 includes instructions for indicating proximity to boundaries, which may indicate how close the IED module 450 of distributed controller 400 or another controller such as an external IED (which also may include protection or controller condition and communicated via sensor component 420, or communication network interface 432, or monitored equipment interface 429) is towards reaching a condition where a control instruction may be issued. The control may be related to a continuous or a discontinuous control operation. A discontinuous control operation may change either the topology of the electric power delivery system or result in reaching a capability limit of the equipment or a controller. For example, the assessment module 463 may use the state and the model information as part of IED module 450 to determine that a breaker should open due to an overcurrent condition in a certain amount of time if the condition persists (and no other actions are taken to correct the overcurrent condition). In another example, the assessment module 463 may determine a time before a controller (such as a distributed controller or an external IED, which also may include protection or controller condition) will issue a command to a synchronous machine to decrease the amount of reactive power the synchronous machine produces due to the rotor field thereof reaching a thermal limit from excessive reactive power being supplied by the synchronous machine. Such information may be communicated to other distributed controllers and/or coordination controllers using the communication module 470 as described in more detail below.

Thus, information about actions to be taken in the future by the distributed controller 400 and/or a time before such actions are to be taken may be communicated to other distributed controllers and/or coordination controllers. State modules and component model modules of other distributed controllers and/or coordination controllers could then use this information in determining a state and/or model of the electric power delivery system. By providing this information to other distributed controllers and/or coordination controllers, modeling errors and/or complexity thereof may be reduced.

The component model module 464 may include instructions for determining a model of the electric power delivery system. The component model module 464 may include instructions for interpreting the state determined by the state module 461 and/or the topology determined by the topology module 462. In the protection, automation, control, and/or metering of an electric power delivery system, different information from different devices may be made available. That is, devices may be manufactured by different entities, include different settings or thresholds, and the like, and may, therefore, provide different information. The component model module 464 may include instructions to improve this different information. The component model module 464 may include instructions to provide an estimate when certain state information is not available. For example, if a measurement normally provided by a sensor is not available, the component model module 464 may use a state from the state module 461 and/or a topology from the topology module 462 to provide an estimate for the missing measurement. In another example, if a distributed controller or an IED is not set to provide a derived value, the component model module 464 may use a state from the state module 461 and/or a topology from the topology module 462 to provide an estimate for the missing derived value. In yet another example, if an equipment status is missing, the component model module 464 may use a state from the state module 461 and/or a topology from the topology module 462 to provide an estimate for the missing equipment status. The component model module 464 may include instructions to supply a time stamp with the estimates. Further, as with the state module 461, the component model module 464 may be configured to indicate information that is estimated.

Furthermore, the component model module 464 may include instructions to determine an IED model. The component model module 464 may model, for example, a protection algorithm of an IED model (either an IED 450 or an external IED), and execute the protection algorithm using the same inputs (equipment status, measurements, and/or derived values either provided from the distributed controller or estimated by the component model module 464) as the protection algorithm would use. The component model module 464 may then use the execution to determine a state of the IED model. Such state may be used by the assessment module 463.

The component model module 464 may further be used to calculate future state. Accordingly, the component model module 464 may include a load-flow level simulation engine and/or a transient level simulation engine. A load-flow engine may be used for calculating dynamics such as, for example, those related to voltage collapse and asset removal due to overload. The transient level simulation engine may be used for calculating dynamics such as, for example, those related to rotor angle instability. Such simulations may be applied to either initial state measurements and/or controller conditions, received from state module 461, to determine a future state of the electric power delivery system. Such future state may be used by distributed controllers and/or coordination controllers to make control decisions in advance of when such decisions would typically be made in systems where information is only available as it is measured. A prediction interval may be based on a packet transmission interval or on a subset of intervals. Accordingly, each time a new set of states and measurements are received, a simulation may provide another set of future state information, based on the new initializing information. As is described in more detail below, the component model module 464 may receive control instruction suggestions from other distributed controllers and/or coordination controllers. The component model module 464 may use such instructions in its determination of possible future states of the electric power delivery system.

The control module 465 may include instructions for determining a control instruction based on outputs of the component model module 464, assessment module 463, topology module 462, state module 461, and/or IED module 450. Control instructions from the control module 465 may be intended as control instructions for other distributed controllers and/or coordination controllers to take, and may be related to machines or equipment in communication with other distributed controllers. In some cases, control instructions may be only informative or suggestive in nature in that the receiving distributed controller is not obligated to perform the control instruction, but may use the suggested control instruction in coordination with its own determinations and those from other controllers to determine whether it will perform the control instruction. That is, the receiving distributed controller may use the suggested control instruction to determine a future state of the electric power delivery system using its component model module, and use the result of its component model module to issue a control instruction to its monitored equipment. In other cases control instructions may be directive in that they are required actions. Differentiation between these cases may be included with the control instruction.

The communication module 470 may include instructions regarding communication of information from the IED module 450, distributed controller module 460, state module 461, topology module 462, assessment module 463, component model module 464, and/or control module 465 to other controllers. The communication module 470 may include instructions on the formatting of communications according to a predetermined protocol. For example, the distributed controllers and controllers may be configured to communicate according to the IEC 61850 protocol, wherein the communication module 470 may be configured to format communications according to that protocol, receive communications according to that protocol, and make information therefrom available to other modules. Communication module 470 may be configured with subscribers to certain information, and format message headers according to such subscription information. Communication module 470 may be configured to format communications according to a packet structure such as that illustrated in FIG. 6 and described in more detail below.

It should be noted that the various modules of the distributed controller module 460 may be configured to use state and/or controller conditions from other distributed controllers and/or other coordination controllers. As is described herein, state and controller conditions may be communicated among distributed controllers and/or coordination controllers, and used within various of the modules thereof. For example, a distributed controller may use the topology determined by another distributed controller in its assessment module to determine missing state information thereof.

Figure 5:
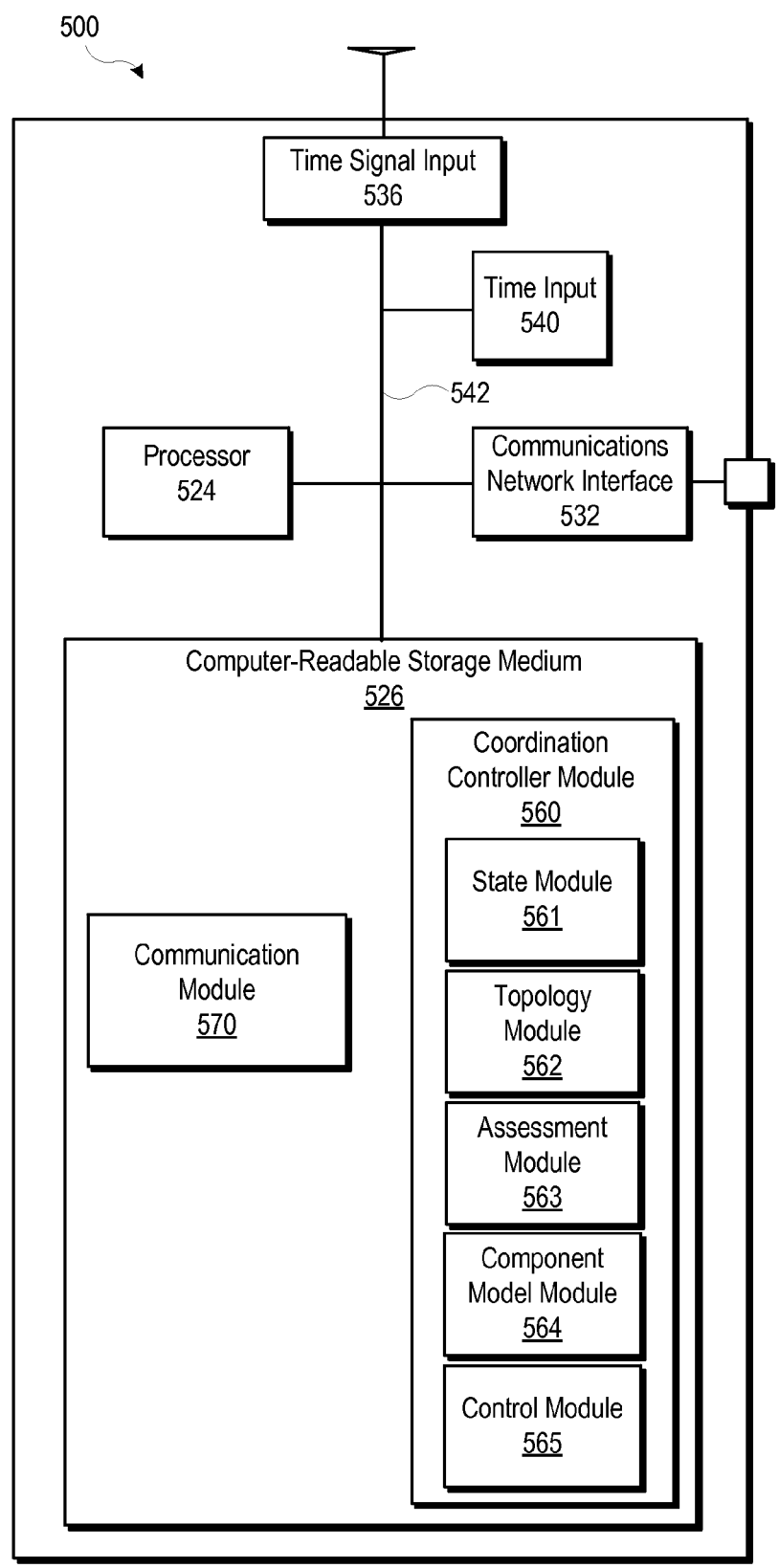
FIG. 5 is a functional block diagram of a coordination controller.

FIG. 5 illustrates a functional block diagram of a coordination controller 500 according to the present disclosure. Not every module of distributed controller 500 is required but it depends on the specific embodiment. As described above in conjunction with FIG. 2, distributed controllers may be in communication with equipment of an electric power delivery system. Distributed controllers may communicate information directly to other distributed controllers and/or to coordination controllers such as station controller(s), regional controller(s), and/or centralized controller(s), such as coordination controller 500. Each of the station, regional, and centralized controllers may perform similar functions, but include different levels of control and/or granularity of data. For example, a regional controller may include a topology module that determines a topology of a portion of the electric power delivery system monitored by each of the distributed controllers that send information to the particular regional controller, whereas station controllers may include a topology module that determines a topology of the electric power delivery system monitored by each of the distributed controllers that send information to the particular station controller.

Similar to the distributed controller 400 illustrated in FIG. 4, coordination controller 500 of FIG. 5 may include a time signal input 536, a time input 540, a communications network interface 532, and a processor 524. Coordination controller 500 may not receive measurements or equipment status directly from a machine or equipment, so may not include a monitored equipment interface. A data bus 542 may link time input 540, network interface 532, time signal input 536, and computer-readable storage medium 526 to a processor 524.

The computer-readable storage medium 526 may include modules similar to those of distributed controller 400 of FIG. 4. However, computer-readable storage medium 526 may lack an IED module. The computer-readable storage medium 526 may include a coordination controller module 560 which may be a repository of the modules and/or executable instructions configured to implement the coordinated controller functionality of coordination controller 500. The coordination controller module 560 may include, among others, a state module 561, a topology module 562, an assessment module 563, a component model module 564, and a control module 565. Each module within the coordination controller module 560 may use information from distributed controllers and/or other coordination controllers. For example, modules within the coordination controller module 560 may use state and/or controller conditions communicated from distributed controllers and/or other coordination controllers over the communications network interface 532. Modules within the coordination controller module 560 may further use time information from the time input 540.

State module 561 may include instructions to determine an electric power delivery system state which may include state of the monitored equipment and the controller condition. That is, the state may include data for defining a state of the monitored equipment, for example, measurements (voltages, currents, and the like), equipment status (breaker open/closed, and the like), derived values, and/or controller condition, which may be provided to the coordination controller originating from distributed controllers. The state module 561 may include instructions to obtain such state information from the communication module 570. The state module 561 may include instructions to derive such state information based on a model from the component model module 564, to be described in more detail below. The state module 561 may further include instructions to refine information from a model generated by the component model module 564. The state module 561 may refine values using a filter such as a low-pass filter. The state module 561 may refine values by comparing values against expected ranges and/or other recent measurements. When such values are not acceptable based on the expected ranges and/or other recent measurements, the values may be indicated as being potentially inaccurate. As described in more detail below, the communication module 570 may include instructions to send information from the state module 561 to distributed controllers and/or other coordination controllers, and include with the information the indication that such information may be inaccurate.

Topology module 562 may include instructions to determine a topology of at least a portion of the electric power delivery system. The topology module 562 may receive information concerning the topology of the electric power delivery system from, for example, a user, distributed controllers or other coordination controllers, or the like. The topology information may be limited by the user to include a portion of the electric power delivery system topology. The topology module 562 may include instructions to modify the stored topology information based on state. For example, if the distributed controller receives information concerning open or closed status of a switch, the topology module 562 may be configured to update its topology based on the received information concerning the open or closed status of the switch. Further, the topology processor 562 may be configured to use values such as currents and/or voltages to determine the topology. For example, Kirchhoff's law may be used to determine which nodes of the topology are connected to which other nodes of the topology, and, hence, the topology may be updated using such information. Additional methods for determining a topology are found in U.S. Pat. No. 7,856,327 titled "State and Topology Processor" naming Edmund O. Schweitzer, Marcos A. Donolo, and Armando Guzman-Casillas as inventors, which is hereby incorporated by reference in its entirety.

Assessment module 563 includes instructions for indicating proximity to boundaries, which may indicate how close an IED model (from, for example, a distributed controller, the component model module 564, or another coordination controller) is towards reaching a condition where a control instruction may be issued. The control may be related to a continuous or a discontinuous control operation. A discontinuous control operation may change either the topology of the electric power delivery system or result in reaching a capability limit of the equipment or a controller. For example, the assessment module 563 may use an IED model and the state to determine that a control instruction will be issued to open a breaker due to an overcurrent condition in a certain amount of time if the condition persists (and no other actions are taken to correct the overcurrent condition). In another example, the assessment module 563 may determine a time before a controller (such as a distributed controller) will issue a command to a synchronous machine to decrease the amount of reactive power the synchronous machine produces due to the rotor field thereof reaching a thermal limit from excessive reactive power being supplied by the synchronous machine. Such information may be communicated to distributed controllers and/or other coordination controllers using the communication module 570 as described in more detail below.

Thus, information about actions to be taken in the future by a distributed controller and/or a time before such actions are to be taken may be communicated to distributed controllers and/or other coordination controllers. State modules and component model modules of distributed controllers and/or other coordination controllers could then use this information in determining a state and/or model of the electric power delivery system. By providing this information to distributed controllers and/or other coordination controllers, modeling errors and/or complexity thereof may be reduced.

The component model module 564 may include instructions for determining a model of the electric power delivery system. The component model module 564 may include instructions for interpreting the state determined by the state module 561 and/or the topology determined by the topology module 562. In the protection, automation, control, and/or metering of an electric power delivery system, different information from different devices may be made available. That is, devices may be manufactured by different entities, include different settings or thresholds, and the like, and may, therefore, provide different information. The component model module 564 may include instructions to improve this different information. The component model module 564 may include instructions to provide an estimate when certain state information is not available. For example, if a measurement normally provided by a sensor is not available, the component model module 564 may use a state from the state module 561 and/or a topology from the topology module 562 to provide an estimate for the missing equipment state measurement. In another example, if a distributed controller or an IED is not set to provide a derived value, the component model module 564 may use a state from the state module 561 and/or a topology from the topology module 562 to provide an estimate for the missing derived value. In yet another example, if an equipment status is missing, the component model module 564 may use a state from the state module 561 and/or a topology from the topology module 562 to provide an estimate for the missing equipment status. The component model module 564 may include instructions to supply a time stamp with the estimates.

Furthermore, the component model module 564 may include instructions to determine an IED model. The component model module 564 may model, for example, a protection algorithm of an IED model, and execute the protection algorithm using the same inputs (equipment status, measurements, and/or derived values either provided from the distributed controller or estimated by the component model module 564) as the protection algorithm would use. The component model module 564 may then use the execution to determine a state of the IED model. Such state may be used by the assessment module 563.

The component model module 564 may further be used to calculate future state. Accordingly, the component model module 564 may include a load-flow level simulation engine and/or a transient level simulation engine. A load-flow engine may be used for calculating dynamics such as, for example, those related to voltage collapse and asset removal due to overload. The transient level simulation engine may be used for calculating dynamics such as, for example, those related to rotor angle instability. Such simulations may be applied to initial state measurements to determine a future state of the electric power delivery system. Such future state may be used by distributed controllers and/or coordination controllers to make control decisions in advance of when such decisions would typically be made in systems where information is only available as it is measured. A prediction interval may be based on a packet transmission interval or on a subset of intervals. Accordingly, each time a new set of states and measurements are received, a simulation may provide another set of future state information, based on the new initializing information. As is described in more detail below, the component model module 564 may receive control instruction suggestions from other distributed controllers and/or coordination controllers. The component model module 564 may use such instructions in its determination of possible future states of the electric power delivery system.

The control module 565 may include instructions for determining a control instruction based on outputs of the component model module 564, assessment module 563, topology module 562, and/or the state module 561. Control instructions from the control module 565 may be intended as control instructions for distributed controllers and/or other coordination controllers to issue, and may be related to machines or equipment in communication with distributed controllers. In some cases, control instructions may be only informative or suggestive in nature in that the receiving distributed controller is not obligated to perform the control instruction, but may use the suggested control instruction in coordination with its own determinations and those from other controllers to determine whether it will perform the control instruction. That is, the receiving distributed controller may use the suggested control instruction to determine a future state of the electric power delivery system using its component model module, and use the result of its component model module to issue a control instruction to its monitored equipment. In other cases, control instructions may be directive in that they may be required actions. Differentiation between these cases may be included with the control instruction.

The communication module 570 may include instructions regarding communication of information from coordination controller module 560, state module 561, topology module 562, assessment module 563, component model module 564, and/or control module 565 to other controllers. The communication module 570 may include instructions on the formatting of communications according to a predetermined protocol. For example, the distributed controllers and controllers may be configured to communicate according to the IEC 61850 protocol, wherein the communication module 570 may be configured to format communications according to that protocol, receive communications according to that protocol, and make information therefrom available to other modules. Communication module 570 may be configured with subscribers to certain information, and format message headers according to such subscription information. Communication module 570 may be configured to format communications according to a packet structure such as that illustrated in FIG. 6 and described in more detail below.

Higher-level controllers may include information and modules that are sparser than lower-level controllers. For example, a central controller may include topology and state information for major electric power paths over a wide area, whereas station controllers may include specific topology and state information for each conductor and monitored equipment within a particular substation.

Further, lower level controllers may be configured to communicate less data to higher-level controls. For example, a station controller may be configured to not send all measurements to regional or central controllers.

The distributed coordinated wide-area control system may act to resolve instabilities in the electric power delivery system. Control actions are taken by the distributed controllers, since they are connected to equipment, including breakers, field limiters, capacitor banks, shunt reactors, general loads, motors, generators, and the like.

A source of direction as to the needed control actions is from any of the controllers in the distributed coordinated wide-area control system: distributed controllers, station controllers, regional controllers, or central controllers. The specific details as to how these commands are communicated can be according to any protocol useful for communicating electric power delivery system information such as, for example, IEC-61850, MirroredBits®, fast operate protocol, and the like.

One way of communicating control is through recipes. Recipes may be used to communicate a series of actions to be taken by specific equipment at specific times. Such actions and associated times or delay times may be communicated from a coordination controller to distributed controllers. These communications may include the specific actions to be taken along with the specific times for taking these actions, or times to wait after the first or preceding action is taken. Further information as to recipes is included in US Patent Application Publication Numbers 2011/0035065, 2011/0035066, and 2011/0035076, each of which are incorporated herein in its entirety.

Each controller, whether distributed controller or coordination controller may collect the information it has subscribed to from the other controllers in the network. Accordingly, a controller that subscribes to information from another controller may be a subscribing controller. It should be noted that any controller (distributed controller or coordination controller) may be a subscribing controller to any other controller in communication therewith. The controller then may combine this information with certain information such as, for example, its equipment status, measurements, derived values, state, models, and/or topology status information. The controller then takes action either based on a present state of the system or based on a prediction of the future state of the system.

Both discontinuous and continuous control may be regularly applied by IEDs and/or distributed controllers. This disclosure brings new information, and devices to collect, distribute, and simplify this new information, in a manner that may improve the performance of both discontinuous and continuous control. Incorporation of the state and controller conditions may be used to predict the upcoming states of the power system, which may make it possible for the distributed controllers in the distributed coordinated wide-area control system to take a lower cost control action and to do so in a timelier manner than what is possible with the existing methods.

An additional control made possible by the distributed coordinated wide-area control system is through indirect control. State information and controller conditions may be measured and/or modeled by the distributed coordinated wide-area control system, and used to correct a trajectory before action is taken, if such a correction provides a better means to control the power system than an existing discontinuous or continuous control action.

In one example, an IED module may be configured to remove a transformer from service after the current levels through the transformer have exceeded a threshold for a certain length of time. The state information and controller conditions (via the state module, assessment module, component model module, or other modules) may have information of that threshold and how long it is until the transformer is to be disconnected. Also, because the state and the controller conditions have been shared and time-synchronized, this makes it possible to determine if the current is transiently exceeding the threshold or if another control action may be taken to lower the current. Then, the distributed controller may coordinate an alternative control and may adjust a set-point of the IED module, in a manner that avoids removing the transformer from service while also keeping the transformer from exceeding a safe operating limit. If the current is exceeding the threshold transiently then it may be sufficient to temporarily modify the set-point, thus allowing the transformer to remain in service even though it would have been removed from service if the set point had not been changed, then return the set point to its previous value once the transient has passed. This is a form of indirect control because the power system has been controlled but without modifying topology thereof. Furthermore, a protection algorithm of the IED module itself has not received any new inputs; it is just the set-point that is adjusted. Alternatively, if another control is required and issued by the distributed coordinated wide-area control system, then the set-point is temporarily modified while the other control acts. The set-point may then be returned to its original value. For example, the other control may open a breaker to remove load so that the threshold is not exceeded. This may allow time for the other control to act and may avoid removal of both load and transformer.

Figure 6:
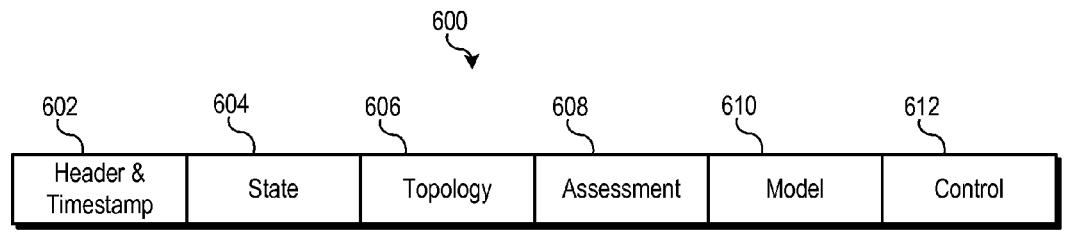
FIG. 6 is a diagram of a communication packet.

Communication among controllers (distributed controllers and/or coordination controllers) may be according to a predetermined protocol. In one example, a packet-based communication is used. A communication protocol may be particularly designed to define a packet for communication of state and controller conditions. The protocol may be defined to avoid sending repeated information. FIG. 6 illustrates one example of a packet 600 for communication of operational and controller conditions among controllers of the present disclosure.

As described above, each controller may determine state and controller conditions. Such may include state information from a state module, topology information from a topology module, assessment information from an assessment module, model information from a component model module, and control information from a control module. Accordingly, packet 600 is designed to include separate sections for each type of information.

Packet 600 includes a header and timestamp section 602 to include header information as well as a time stamp related to the information in the packet. The header information may include communications network header information such as destination address, source address, and the like.

Packet 600 may also include a state section 604 for state information, which may include, for example, equipment status, measurements, derived values, and/or controller condition; a topology section 606 for topology information; an assessment section 608 for assessment information; a model section 610 for model information; and a control section 612 for control information.

Every packet 600 does not need to contain each of the sections state 604, topology 606, assessment 608, model 610, and control 612. Only information needed may be sent. Inclusion of a section may depend on whether relevant information for that section is required for communication.

Packets may be sent at regular intervals and/or upon request. Packets may be sent to subscribing controllers. Dynamics of electric power delivery systems may vary over a wide range of time scales. The dynamics of the electric power delivery system may change at a sub-cycle rate, that is, faster than 60 times per second for a 60 Hz electric power delivery system. But many dynamics of synchronous machines may change at a slower rate. For example, a voltage controller may have a transient response on the order of a second and a governor may have a transient response on the order of tens of seconds. Dynamics of load control such as tap-changing transformers in some cases are even slower, such as, on the order of minutes. An interval of packet transmission may depend on the type of phenomena under control. A typical update rate is 60 packets every second, each initiating at the start of the second and then continuing at intervals of 1/60 second after that point, and repeating again at the start of the next second. The time of packet transmission may be set by the time-keeping of each controller, which, as described previously, may be shared by all devices in a distributed coordinated wide-area system.

Although a particular packet design is illustrated in FIG. 6, this disclosure is not limited to any particular packet design. Any packet design or communication protocol able to communicate the information described herein may be used.

The transmission of a device model may provide certain advantages in maintaining consistency and accuracy among various devices in an electric power delivery system. Where a device parameter from a first is transmitted to a second device and incorporated into a device model generated by the second device, certain issues (e.g., consistency, compatibility, etc.) may arise. These issues may be avoided in a system where devices transmit complete device models.

The distributed coordinated wide-area control system for electric power delivery systems of the present disclosure may be used in conjunction with various electric power delivery systems. It is appreciated that electric power delivery systems may include control devices of many types and functionality, from different vendors, and the like. Indeed, it has been observed that electric power delivery systems may even include electromechanical protection devices. Protection and control devices either presently in use or for future implementation may not be capable of, designed to, or set, to provide information intended to be shared among controllers according to the present disclosure. For example, IEDs may not be configured to share state as well as controller conditions.

It should be appreciated that certain microprocessor-based IEDs may be re-programmed with instructions for deriving and sharing information in accordance with the present disclosure. For example, a firmware upgrade that includes a distributed controller module or a coordination controller module may be possible for certain existing IEDs and automation controllers. Further, future IEDs communications devices, automation controllers, and the like, may be designed with distributed controller modules and/or coordination controller modules according to the present disclosure.

However, to facilitate the distributed coordinated wide-area control in an electric power delivery system with devices that do not derive and/or share information according to this disclosure, also disclosed is a proxy device for facilitating derivation and sharing of information according to the present disclosure.

Figure 7:
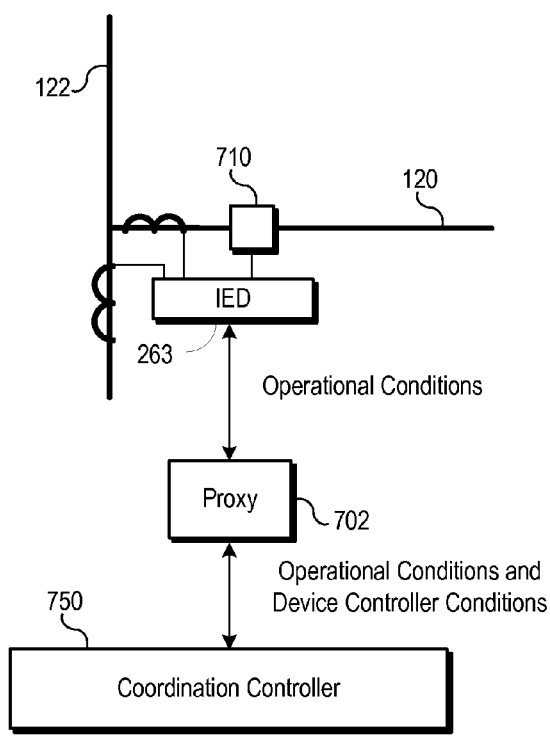
FIG. 7 is a simplified one-line diagram of a system for communicating distributed controller conditions using a proxy.

FIG. 7 illustrates a simplified one-line diagram of a portion of an electric power delivery system using an IED 263 and a proxy 702 according to the disclosure. The electric power delivery system may include a bus 122 and a transmission line 120 protected by an IED 263 that may obtain signals from both the bus 122 and the transmission line 120. IED may perform protection algorithms using equipment status, measurements, derived values, and an IED model thereof. IED 263 may operate breaker 710 to selectively disconnect transmission line 120. IED 263 may be configured to derive only certain values for its IED model, and may be configured only to communicate certain information. For example, IED 263 may be configured to communicate voltage and current magnitudes and angles.

Proxy 702 may be configured to receive certain equipment status, measurements, and/or derived values from IED 263, and derive or calculate further derived values, controller condition, as well as controller conditions (such as distributed controller conditions) of IED 263. Proxy 702 may further be configured to communicate the state as well as the controller conditions to coordination controller 750. Proxy 702 may further be configured to receive state and/or controller conditions from other controllers via coordination controller 750.

Figure 8:
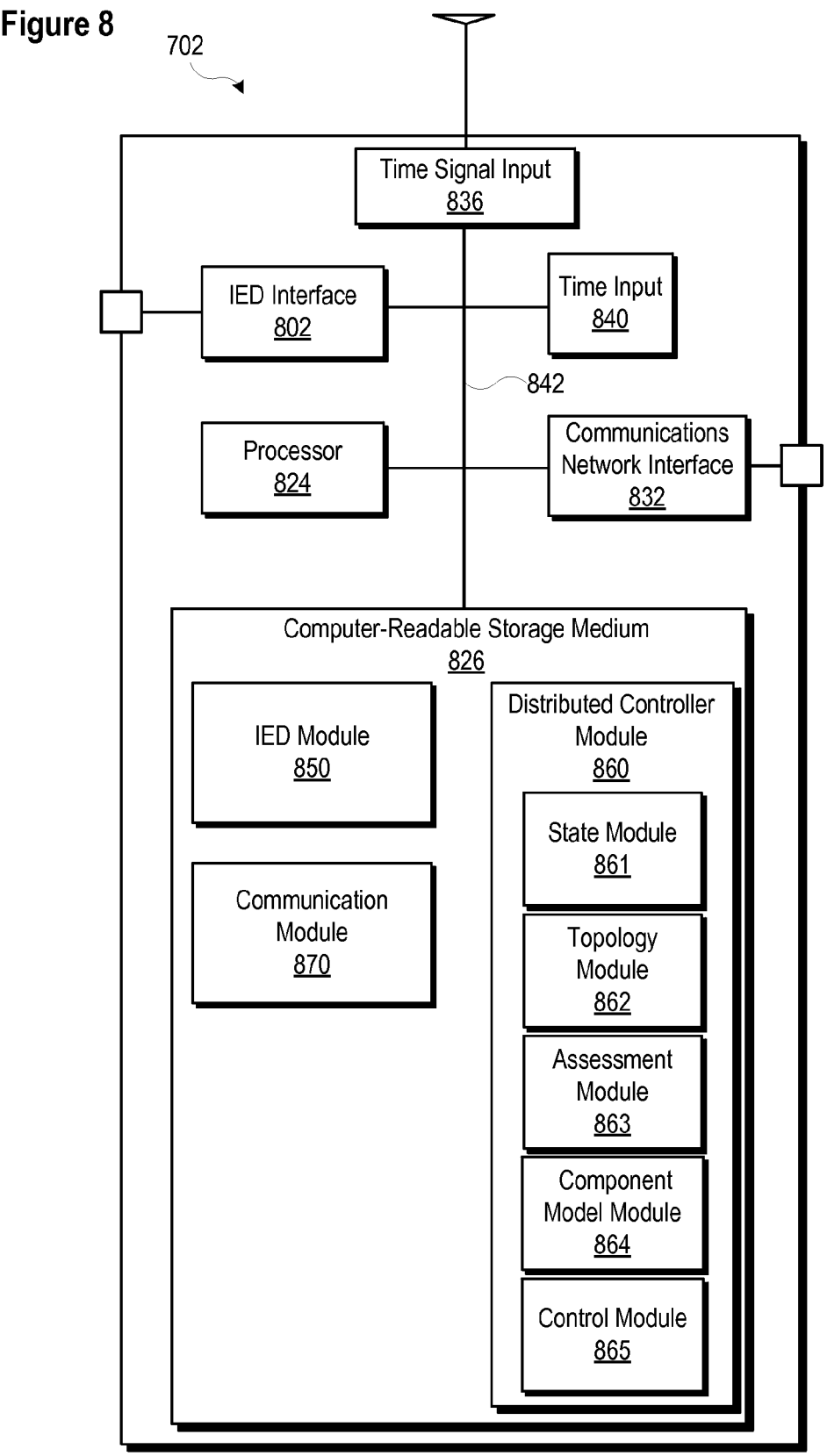
FIG. 8 is a functional block diagram of a distributed controller proxy.

FIG. 8 illustrates a functional block diagram of proxy 702. Not every module of proxy 702 is required but it depends on the specific embodiment. Proxy 702 includes a network interface 832 configured to communicate with a communication network and/or a coordination controller. Proxy 702 also includes a time input 840, which may be used to receive a time signal. In certain embodiments, a common time reference may be received via network interface 832, and accordingly, a separate time input and/or GNSS input 836 would not be necessary. One such embodiment may employ the IEEE 1588 protocol. Alternatively, a time signal input 836 may be provided in addition or instead of a time input 840.

An IED interface 802 may be configured to receive certain available equipment status, measurements, derived values, and/or control instructions from, and send certain state information and/or control instructions to, an IED. According to certain embodiments, the IED interface 802 may be configured to interface with a variety of IEDs of an electric power delivery system. Further, according to another embodiment, an electromechanical relay may be used instead of an IED. In this embodiment, certain information may be obtained from the electric power delivery system. For example, the same instruments used by the electromechanical relay (such as CTs, PTs, and the like) may provide information to proxy 702. In this case, proxy 702 may include a sensor component such as that illustrated in FIG. 4.

A computer-readable storage medium 826 may be the repository of one or more modules and/or executable instructions configured to implement any of the processes described herein. A data bus 842 may link IED interface 802, time input 840, network interface 832, time signal input 836, and computer-readable storage medium 826 to a processor 824.

Processor 824 may be configured to process communications received via network interface 832, time input 840, time signal input 836, and IED interface 802. Processor 824 may operate using any number of processing rates and architectures. Processor 824 may be configured to perform various algorithms and calculations described herein using computer executable instructions stored on computer-readable storage medium 826. Processor 824 may be embodied as a general purpose integrated circuit, an application specific integrated circuit, a field-programmable gate array, and other programmable logic devices.

An IED interface 802 may be configured to receive status information from, and issue control instructions to an IED. IED interface 802 may be configured to issue control instructions to one or more IEDs. According to some embodiments, control instructions may also be issued via network interface 832. Control instructions issued via network interface 832 may be transmitted, for example, to distributed controllers, coordination controllers, IEDs, or the like (not shown), which in turn may issue the control instruction to a piece of monitored equipment. Alternatively, the piece of monitored equipment may receive the control instruction directly via its own network interface. The control instructions may also include an instruction to modify the IED module (for example, a setting or threshold thereof).

Computer-readable storage medium 826 may be the repository of one or more modules and/or executable instructions configured to implement certain functions described herein. For example, computer-readable storage medium may include IED module 850, which may include the modules and/or executable instructions for the IED model. As described above, the IED model may include protection algorithms, elements, settings, thresholds, timers, and the like. The IED module 850 may include instructions for deriving or calculating derived values, for obtaining equipment status, obtaining measurements, and applying such to the IED model. In applying such to the IED model, the IED module 850 may determine control instructions to make, state to communicate, state to store, and the like. Also as noted above, such control instructions may be communicated to monitored equipment and/or an IED using the IED interface 802. The IED module may further include instructions for applying a time stamp to equipment status as it is obtained, to measurements as they are obtained, to derived values and/or protection or controller condition as they are obtained or corresponding to when the measurements leading thereto are obtained, to control instructions as they are given, and the like.

IED module 850 may be obtained from an attached IED, may be programmed at setting time, or may be determined by proxy 702 based on observations of the delivered information from the IED and control instructions from the IED. Proxy 702 may include several predetermined IED models that may be selected at setting time. For example, if the IED includes an overcurrent element, proxy 702 may include several overcurrent elements to select, and a user may select the overcurrent element most closely related to the overcurrent element of the IED. Alternatively, an IED module could be configured to select a predetermined IED model based on observations of the IED communications and/or control instructions. For example, the IED may communicate measurements and derived values corresponding with current magnitudes, and control instructions corresponding with opening of a breaker. The IED module may observe the threshold(s) and durations (s) at which the IED issues control instructions to open a breaker, and use this information to select an appropriate overcurrent element among a plurality of overcurrent elements. Likewise, an IED may be a voltage regulator controller, and may communicate voltage measurements and issue tap change commands. The IED module may select appropriate voltage bands according to the observed measured voltages and commands.

Computer-readable storage medium 826 may further include a distributed controller module 860, which may be a repository of the modules and/or executable instructions configured to implement the distributed controller functionality of proxy 702. The distributed controller module 860 may include, among others, a state module 861, a topology module 862, an assessment module 863, a component model module 864, and a control module 865. Each module within the distributed controller module may be similar to those similar models of FIG. 4 described hereinabove.

Communication module 870 may include instructions regarding communication of information from the IED module 850, distributed controller module 860, state module 861, topology module 862, assessment module 863, component model module 864, and/or control module 865 to other controllers, as described above. Communication module 870 may further include instructions regarding communication of information back to the IED. As IED module 850 may be configured to receive certain information in a certain format from other IEDs and/or controllers, the communication module 870 may be configured to gather such information, format it as the IED may expect to receive it, and send such information to the IED.

Figure 9:
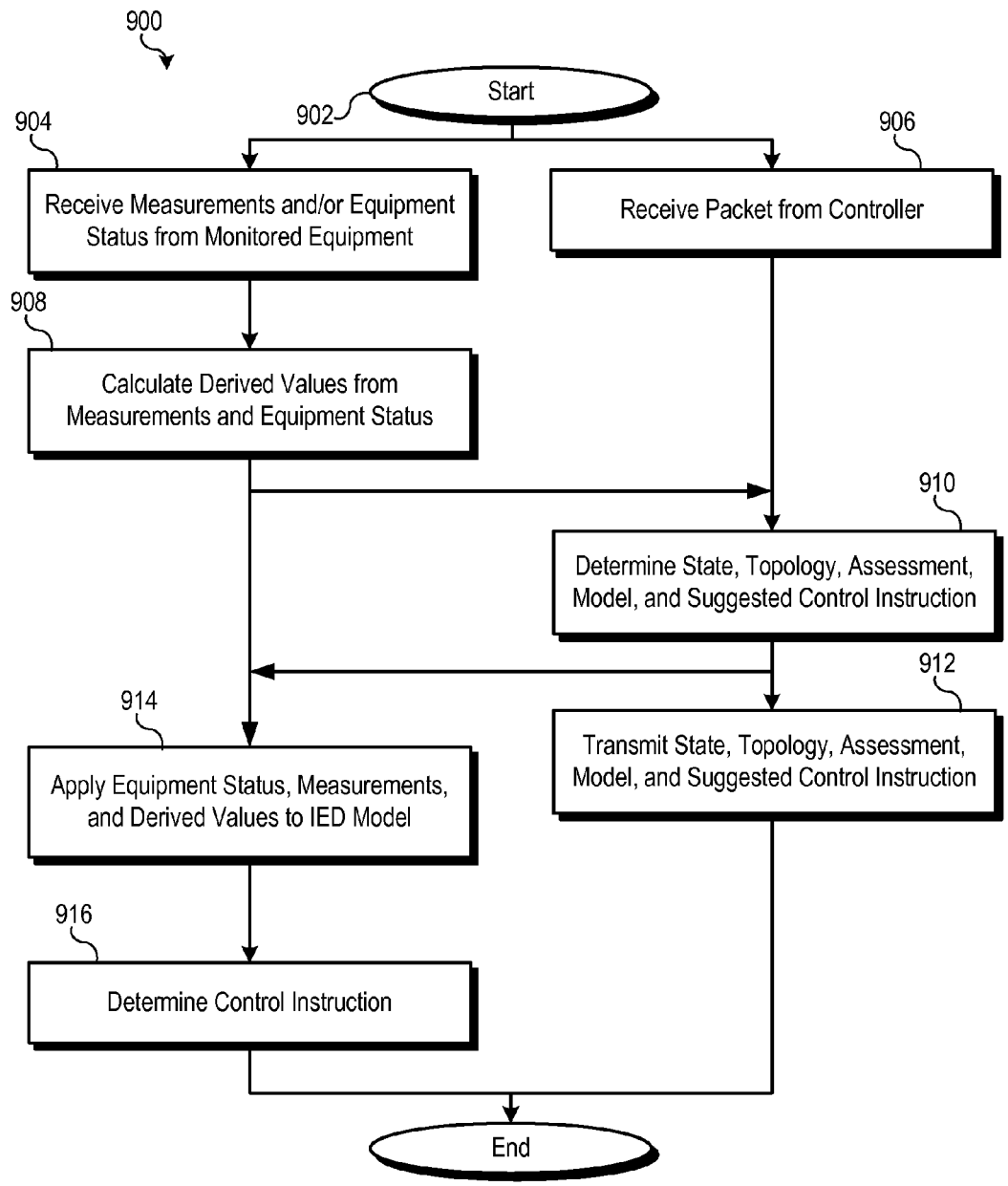
FIG. 9 illustrates a method of a distributed controller providing distributed coordinated wide-area control according to one embodiment.

FIG. 9 illustrates a method 900 of a distributed controller providing distributed coordinated wide-area control for an electric power delivery system according to one embodiment. It should be appreciated from the above description that each distributed controller (or proxy) provides distributed control to associated equipment in that each makes its own determination as to control actions to take. However, the control is coordinated in that the state and controller conditions are communicated for wide-area coordination of control actions.

The method 900 starts 902 with a distributed controller receiving measurements and/or equipment status, protection or controller condition from monitored equipment 904. The method may time stamp the measurements. A distributed controller further receives a communication packet from a controller 906 such as another distributed controller or a coordination controller. As described above, the packet may include state and controller conditions. That is, the packet may include a time stamp, state information, topology information, assessment information, model information, and/or control information associated with a particular controller or controllers.

The method may calculate state from measurements and equipment status 908 from the monitored equipment. The state may be time stamped. Such state as well as information from the packet may be used by the method to determine refined state, topology, assessment, model, and suggested control instruction information 910. Information may be time aligned using time stamps associated therewith. That is, in one embodiment time stamps may be compared such that state from the distributed controller and state from the packet are stamped with the same time instant. The method may transmit the determined state, topology, assessment, model, and/or suggested control instruction 912. As described above, the IED module may be modified due to coordinated control instructions by, for example, temporarily modifying a threshold, setting, or the like.

As described above, state information may be refined in the various modules and determinations made in 910. The derived values and/or state may be applied to an IED model 914 and the method may determine and issue a control instruction 916.

Figure 10:
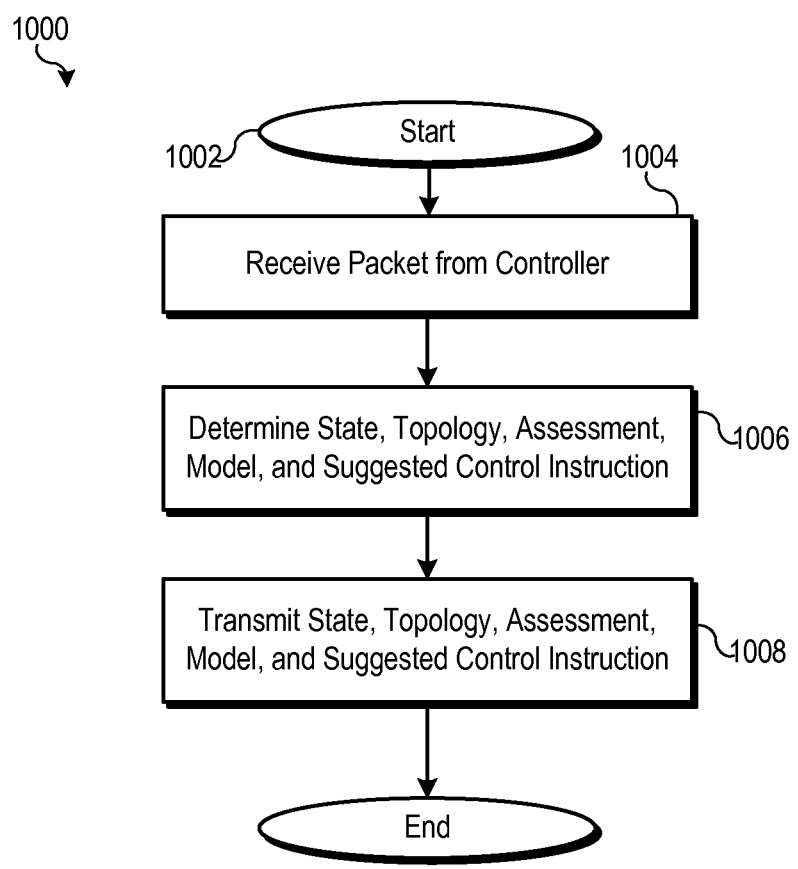
FIG. 10 illustrates a method of a coordination controller providing distributed coordinated wide-area control according to one embodiment.

FIG. 10 illustrates a method 1000 for a coordination controller providing distributed coordinated wide-area control for an electric power delivery system according to one embodiment. The method 1000 starts 1002 and receives a packet from another controller 1004. As described herein, the packet may be received from a distributed controller and/or from another coordination controller. The method then determines state and controller conditions. For example, the method determines state information, topology information, assessment information, model information, and/or suggested control instruction information 1006. The method transmits the state information, topology information, assessment information, model information, and/or suggested control instruction information 1008 to subscribing controllers.

In one specific example that may be described with relation to FIG. 2, an electric power delivery system 100 may be leading towards voltage collapse. A distributed controller 261 receives equipment status and measurements of state from generator 130, which includes a voltage and a current at the generator 130 terminals as well as an internal excitation value and excitation set points of the generator 130. These equipment status and measurements, as well as derived values and a controller condition may be processed by station controller 280. Station controller may include a state module, such as state module 461 illustrated in FIG. 4, configured to refine, filter, and correct values as necessary. After processing, a component model module, such as component model module 464 illustrated in FIG. 4, may be applied by station controller 280. The component model module applies a model of the generator automatic voltage regulator and determines that under the present conditions for this example the reactive requirements do not exceed those that the generator exciter controller allows.

Information calculated by station controller 280 may be communicated from station controller 280 to regional controller 290. According to some embodiments, the packet structure illustrated in FIG. 6 may be used to transmit the data. The information may include the equipment status, measurements (e.g., voltage, current, excitation measurements), a state included in the device model (internal state of the voltage regulator controller), and, derived values of the generator 130 frequency, real power, and reactive power. Topology information communication from station controller 280 to regional controller 290 may indicate, among other things, that the generator is presently connected to the power system 200. The information regarding an assessment may include an indication that delivered reactive power does not exceed its thresholds. The information may include information about a device model may include the automatic voltage regulator model, sent as a set of parameterized differential equations. Control information may provide an indication that no discontinuous controls are required.

Simultaneously, distributed controller 265 receives measurements of state from load 141. Distributed controller 265 may refine, filter, and correct values as necessary, which may then be applied to a component model module 464 by distributed controller 265. The component model module may determine that the load is increasing according to a rate that is consistent with historical assessments made by distributed controller 265 and based on this rate predicts its power draw. The model may include information relevant to factors that influence load increase such as the effect of tap changing transformer state. Information regarding the load may be communicated to regional controller 290. According to some embodiments, the information may be communicated using the packet structure illustrated in FIG. 6. State information communicated to regional controller 290 may include equipment status, measurements (e.g., voltage and current), derived values of the load 141 (e.g., frequency, real power, and reactive power), and/or controller condition. Topology information may include an indication that the load 141 is presently connected to the power system 200 and information relating to how it is connected, since load 141 may encompass a more complicated underlying section of the power system. Device model information may include a load model, sent as a function of the load 141 voltage levels and how the load is expected to increase with time.

Simultaneously, distributed controller 263 receives measurements from line sensors associated with the transmission line 120. These measurements include the voltage and current of the transmission line 120. Measurements of the state of IED module 451 are also be included. In this example the IED is included with distributed controller 263. In another embodiment the IED is external to the distributed controller as shown in FIG. 7, a proxy may be used, such as is shown by FIG. 7. These measurements are processed by distributed controller 263, which may include a state module and a component model module 464. Information regarding a state may be communicated using a packet structure, such as the structure illustrated in FIG. 6. The information communicated to station controller 280 may include a state information, such as electrical measurements (e.g., voltage, current), equipment status based on the model (e.g., and internal state of the IED Module), and, derived values of the line (e.g., frequency, real power, and reactive power). Topology information may include an indication that the line is presently connected to the power system 200. Control information may include an indication that no discontinuous controls are required.

Station controller 280 may receive information from distributed controller 261, distributed controller 263, and through regional controller 290, distributed controller 265. The station controller 280 may also receive information from distributed controller 260 and distributed controller 262. From the received measurements 604, refined and corrected as necessary with using a state module associated with station controller 280; the received topology information may be processed with a topology module associated with station controller 280; and the received model information may be processed by a model module associated with station controller 280. The station controller 280 may compute a load-flow calculation using a state module to determine any missing equipment status values or measurements. The load-flow calculation may also calculate the future equipment statuses and measurements using a model and over a time frame suitable for controlling voltage. According to some embodiments, the time frame may be on the order of tens of seconds to tens of minutes. The calculation may be based on the load model and state information as received from distributed controller 265, the generator models and state received from distributed controller 261, and the IED module and IED operating conditions received from distributed controller 263. Model information not received can be implemented directly into a model module associated with station controller 280. However, it is possible that such information does not include the most accurate available model since it was not sent directly from an originating distributed controller.

A control command may be issued based upon an analysis of the measurements and state determinations. For example, a discontinuous control action (e.g., removal of transmission line 120) may be implemented, or the control action may comprise an adjustment of a power system operating condition (e.g., it may be determined that the generator has reached its reactive power limits, and accordingly, the generation may reduce its reactive power output). The control command is sent using a control field in a data packet formatted in accordance with FIG. 6, or other suitable protocols, such as IEC 61850 GOOSE (Generic Object Oriented Substation Events) and/or a Mirrored Bits® or the like. In one case, the control command is to distributed controller 265 for removal of load. In another case, the control command is to a distributed controller connected to generator 131 (not illustrated) instructing it to increase its reactive power output. In another case, the control command is to distributed controller 263 instructing it to refrain from tripping the line temporarily if it is determined that such action is sufficiently temporary to not jeopardize safety, or cause equipment damage or a subsequent instability. In another case there is no need to issue a control command because the anticipated behavior is expected. Differentiation between these responses may be based upon how a given utility prefers to respond to the specific conditions of the system.

In addition, according to certain embodiments, the station controller 280 may communicate a simplified version of the model that it contains and has received. The simplification includes collapsing sections of the load flow and other models into less complicated models. For example, it is possible to take a large collection of loads and combine them into a single load model. It is also possible to take a collection of lines and combine them into a Thevenin equivalent. According to some embodiments, the reduced model and state information associated with it may be communicated using a packet in the format illustrated in FIG. 6. A state field may include the state including equipment status, measurements, derived values, and controller condition according to the reduced model. A topology field may include information regarding the power system configuration in the reduced model. The assessment field 608 may include assessment information according to the reduced model. The model field may include the reduced model. A control field may include control commands according to the reduced model.

Assessment of power system conditions continues in a like manner, monitoring the state of the power system, communicating measurements, derived values, controller condition, equipment status, topology, assessment information, models and control. The monitoring and control continues while the power system is in a normal operating condition and in a condition which may require control actions.

While specific embodiments and applications of the disclosure have been illustrated and described, it is to be understood that the disclosure is not limited to the specific configurations and components disclosed herein. Accordingly, many changes may be made to the details of the above-described embodiments without departing from the underlying principles of this disclosure. The scope of the present invention should, therefore, be determined only by the following claims.

What is claimed is:

1. A controller configured to implement coordinated control actions in an electrical power delivery system, the controller comprising:
 a communications interface;
 a processor communicatively coupled to the communications interface; and
 a non-transitory computer-readable storage medium comprising instructions that, when executed by the processor, enable the controller to:
  derive a first state of at least one portion of the electric power delivery system based upon an indication received via the communications interface;
  calculate a first controller condition comprising a state of a protective function of the controller;
  calculate a proximity of the first state to a possible control action;
  generate a component model based on the first state;
  model a response of a component of the electrical power delivery system based on the component model;

determine a control action that may be selectively adopted or not adopted from the possible control action, based upon the first state, the proximity of the first state to the possible control action, the modeled response of the component, and the first controller condition;

communicate the first state, the first controller condition, and the control action to a subscribing controller via the network; and, implementing the control action.

2. The controller of claim 1, wherein the component modeled by the component model comprises one of the controller, a subscribing controller, an intelligent electronic device, and a load.

3. The controller of claim 1, wherein the instructions further enable the controller to compare the first state to a stability condition of the component model, and wherein the control action is configured to cause a transition from the first state to a second state that maintains the stability condition.

4. The controller of claim 1, wherein the component model is configured to model a response of one of an instantaneous overcurrent element; an inverse-time overcurrent element; a thermal element; a reactive power control element; a distance element; a current differential element; a load encroachment element; an impedance characteristic control element; an undervoltage element; a directional element; a negative sequence current element; a loss of excitation element; a negative sequence voltage element; an overvoltage element; a ground fault element; a high-impedance fault element; an underfrequency element; and an overfrequency element.

5. The controller of claim 1, wherein the component model is configured to model a response of one of a reactive power controller, a capacitor bank controller, a transformer tap changing controller, a generator over-excitation limit controller, a governor controller, a power system stabilizer controller, a shunt reactor controller, a DC line controller, and an inverter controller.

6. The controller of claim 1, wherein the instructions further enable the controller to transmit the component model to the subscribing controller via the network.

7. The controller of claim 1, wherein the instructions further enable the controller to establish a time at which the control action is to be taken.

8. The controller of claim 7, wherein the control action is configured to modify a topology of the at least one portion of the electric power delivery system.

9. The controller of claim 1, wherein the instructions further enable the controller to calculate a second state based on one of: an input received via the communications interface, and a topology of the at least one portion of the electric power delivery system.

10. The controller of claim 9, wherein the instructions further enable the controller to communicate the second state to the subscribing controller.

11. The controller of claim 1, wherein the instructions further enable the controller to calculate a second controller condition based upon information received from the subscribing controller and to determine a second control action based upon the second controller condition.

12. The controller of claim 1, wherein the communications interface comprises one of a network communications interface and a monitored equipment interface.

13. The controller of claim 1, wherein the controller comprises one of a distributed controller and a coordination controller.

14. The controller of claim 1, wherein the subscribing controller comprises a coordination controller.

15. The controller of claim 1, wherein the control action is configured to temporarily modify an IED set point to accommodate an increase in a flow of current.

16. A method for providing distributed coordinated control to an electrical power delivery system, comprising:

deriving a first state of at least one portion of the electric power delivery system based upon an indication received via a communications interface;

calculating a first controller condition comprising a state of a protective function;

calculating a proximity of the state of the protective function to a possible control action;

generating a component model based on the first state;

modeling a response of a component of the electrical power delivery system based on the component model;

determining a control action that may be selectively adopted or not adopted from the possible control action, based upon the first state, the proximity of the state of the protective function to the possible control action, the modeled response of the component, and the first controller condition;

communicating the first state, the first controller condition, and the control action to a subscribing controller; and implementing the control action by the subscribing controller based upon the first state and the first controller condition.

17. The method of claim 16, further comprising:

determining a time delay associated with the control action; and delaying implementation of the control action by the time delay.

18. The method of claim 16, wherein the control action is configured to modify a topology of the at least one portion of the electric power delivery system.

19. The method of claim 16, further comprising:

calculating a second state based on one of: an input received via the communications interface, and a topology of the at least one portion of the electric power delivery system.

20. The method of claim 19, further comprising:

communicating the second state to the subscribing controller.

21. The method of claim 16, further comprising:

calculating a second controller condition based upon information received from the subscribing controller; and determining a second control action based upon the second controller condition.

22. A controller configured to implement coordinated control actions in an electrical power delivery system, comprising:

a communications interface configured to permit communications with a network;

a processor;

a non-transitory computer-readable storage medium comprising:

a state module configured to derive a first state of at least one portion of the electric power delivery system based upon an indication received via the communications interface;

a topology module configured to determine a topology of the at least one portion of the electric power delivery system based at least in part on the first state and the indication;

an assessment module configured to determine a stability assessment of the first state with respect to a stability condition, the stability assessment comprising a proximity of the first state to a possible control action;

a component model module configured to generate a component model of at least one component of the electric power delivery system based at least in part on the first state; and a control module configured to determine a control action that may be selectively adopted or not adopted from the possible control action, based at least in part upon each of the first state, the topology of the at least one portion of the electric power delivery system, the proximity of the first state to the possible control action, and a response of the at least one component based on the component model, the control module further configured to implement the determined control action.

23. The controller of claim 22, wherein the control action is configured to cause a transition from the first state to a second state that maintains the stability condition.

24. The controller of claim 22, wherein assessment module is configured to determine the stability assessment by comparing the first state to an expected range.

25. The controller of claim 22, wherein the assessment module is configured to determine the stability assessment by comparing the first state against a prior state.

26. The controller of claim 22, wherein the topology module is configured to determine the topology by comparing a prior state having a known topology to the first state.

* * * * *